(12) United States Patent
Qin et al.

(10) Patent No.: US 11,200,558 B2
(45) Date of Patent: Dec. 14, 2021

(54) AUTOMATIC VENDING

(71) Applicant: Advanced New Technologies Co., Ltd., George Town (KY)

(72) Inventors: Yao Qin, Hangzhou (CN); Jun Wu, Hangzhou (CN); Hong Zhang, Hangzhou (CN); Zhe Han, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/888,541

(22) Filed: May 29, 2020

(65) Prior Publication Data

US 2020/0294024 A1    Sep. 17, 2020

Related U.S. Application Data

(63) Continuation of application No. PCT/CN2019/071335, filed on Jan. 11, 2019.

(30) Foreign Application Priority Data

Jan. 23, 2018    (CN) .......................... 201810064196.9

(51) Int. Cl.
*G06Q 20/32* (2012.01)
*H04W 4/80* (2018.01)
(Continued)

(52) U.S. Cl.
CPC .......... *G06Q 20/327* (2013.01); *G06Q 20/18* (2013.01); *G06Q 20/202* (2013.01);
(Continued)

(58) Field of Classification Search
CPC .. G06Q 30/0625; G06Q 20/202; G06Q 20/18; G06Q 20/327; G06Q 20/32;
(Continued)

(56) References Cited

U.S. PATENT DOCUMENTS 7,933,625 B2 * 4/2011 Sugikawa ............. H04W 12/50
455/522
8,739,293 B2 * 5/2014 Walker ..................... G08B 5/22
726/26
(Continued)

FOREIGN PATENT DOCUMENTS

| CN | 102640109 | 8/2012 |
|---|---|---|
| CN | 103106591 | 5/2013 |

(Continued)

OTHER PUBLICATIONS

Extended European Search Report in Application No. 19743660.3, dated Jan. 12, 2021, 14 pages.
(Continued)

*Primary Examiner* — Andrew Joseph Rudy
(74) *Attorney, Agent, or Firm* — Fish & Richardson P.C.

(57) ABSTRACT

The present application discloses resource selection and resource transfer methods and apparatuses, and automatic vending methods and systems. The method includes the following: obtaining, by a mobile device placed within a predetermined range of a resource management terminal, data comprising changes in magnetic field intensity of the resource management terminal; determining, by the mobile device and based on the data comprising changes in the magnetic field intensity, a first target channel from a plurality of channels in a rack of the resource management terminal; and sending, by the mobile device and to the resource management terminal, a target resource selection instruction, wherein the target resource selection instruction comprises information that specifies the first target channel.

22 Claims, 12 Drawing Sheets

(51) Int. Cl.
*H04W 76/10* (2018.01)
*G06Q 20/18* (2012.01)
*G06Q 20/20* (2012.01)
*G06Q 30/06* (2012.01)
*H04W 72/08* (2009.01)
*H04W 84/12* (2009.01)

(52) U.S. Cl.
CPC .......... *G06Q 30/0625* (2013.01); *H04W 4/80* (2018.02); *H04W 72/085* (2013.01); *H04W 76/10* (2018.02); *H04W 84/12* (2013.01)

(58) Field of Classification Search
CPC ......... G06Q 20/20; G06Q 30/06; H04W 4/80; H04W 72/085; H04W 84/12; H04W 76/10; H04W 72/08; G07F 7/00; G07F 11/46
USPC .......................................................... 705/21
See application file for complete search history.

(56) References Cited

U.S. PATENT DOCUMENTS

| | | | | |
|---|---|---|---|---|
| 8,781,622 | B2* | 7/2014 | Mockus | G05B 15/02 700/237 |
| 8,836,225 | B2* | 9/2014 | Snelten | H05B 45/39 315/186 |
| 8,893,922 | B2* | 11/2014 | Azzano | A47J 31/4403 221/96 |
| 9,226,224 | B1* | 12/2015 | Houri | H04W 48/16 |
| 9,472,043 | B2* | 10/2016 | Mockus | G06Q 20/325 |
| 9,974,105 | B2* | 5/2018 | Sasai | H04W 4/80 |
| 10,091,607 | B2* | 10/2018 | Li | H04W 4/80 |
| 10,223,858 | B2* | 3/2019 | Butler | G06Q 20/322 |
| 10,438,200 | B1* | 10/2019 | Griffith | H04L 63/0853 |
| 2004/0012196 | A1 | 1/2004 | Sundqvist et al. | |
| 2013/0324161 | A1 | 12/2013 | Rhoads et al. | |
| 2015/0005933 | A1 | 3/2015 | Mockus et al. | |
| 2016/0259421 | A1* | 9/2016 | Gollakota | H04M 1/72442 |
| 2016/0346671 | A1 | 12/2016 | Jarchafjian et al. | |
| 2017/0255921 | A1* | 9/2017 | Zhang | G06Q 20/123 |
| 2020/0097897 | A1* | 3/2020 | Li | G07F 9/026 |

FOREIGN PATENT DOCUMENTS

| | | |
|---|---|---|
| CN | 103606079 | 2/2014 |
| CN | 106920153 | 7/2017 |
| CN | 107452163 | 12/2017 |
| CN | 108346219 | 7/2018 |
| GN | 103546199 | 1/2014 |
| TW | I442334 | 6/2014 |
| TW | I452858 | 9/2014 |
| TW | 201629865 | 8/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/071335, dated Mar. 27, 2019, 20 pages (with machine translation).

Kknews.cc [online], "One article to understand the principle, characteristics and application of NFC technology", Dec. 29, 2016, retreived on Jun. 16, 2020, retrieved from URL <https://kknews.cc/zh-tw/tech/6k9xyxl.html>, 23 pages (with machine translation).

PCT International Preliminary Report on Patentability in International Application No. PCT/CN2019/071335, dated Jul. 28, 2020, 12 pages (with English translation).

* cited by examiner

AUTOMATIC VENDING

CROSS-REFERENCE TO RELATED APPLICATIONS

This application is a continuation of PCT Application No. PCT/CN2019/071335, filed on Jan. 11, 2019, which claims priority to Chinese Patent Application No. 201810064196.9, filed on Jan. 23, 2018, and each application is hereby incorporated by reference in its entirety.

TECHNICAL FIELD

The present application relates to the field of computer technologies, and in particular, to resource selection and resource transfer methods and apparatuses, and automatic vending methods and systems.

BACKGROUND

A vending machine (VEM) is a machine that can automatically provide products based on inserted coins. The vending machine is a common device of commercial automation. It can save manpower and facilitate transactions without limitations of time and location. The vending machine is a new commercial retail form, also known as a 24-hour mini supermarket.

At present, conventional vending machines, such as button/touchscreen-based vending machines, typically require users to click on the vending machine/mobile terminal to indicate the products selected by the users.

Therefore, a more convenient resource selection solution is needed.

SUMMARY

Implementations of the present specification provide resource selection and resource transfer methods and apparatuses, and automatic vending methods and systems, to alleviate the problem that an existing vending machine requires users to perform relatively complex operations.

An implementation of the present specification provides a resource selection method, including the following: obtaining magnetic field intensity change data of a resource management terminal that is sensed by a mobile terminal within a predetermined range of the resource management terminal; locating identification information of a target channel from multiple channels included in a rack of the resource management terminal based on the magnetic field intensity change data; and sending a selection instruction to the resource management terminal, where the selection instruction includes the identification information of the target channel, and is used to confirm a target resource selected by a user.

Optionally, before the locating identification information of a target channel from multiple channels included in a rack of the resource management terminal based on the magnetic field intensity change data, the method further includes the following: sending a query request to the resource management terminal, where the query request includes identification information of the user; and receiving a channel list of the multiple channels included in the rack that is returned by the resource management terminal in response to the query request.

Optionally, before the sending a query request to the resource management terminal, the method further includes the following: sending a connection request to the resource management terminal when obtaining, through scanning, a Bluetooth signal and/or a Wi-Fi signal sent by the resource management terminal.

Optionally, the channel list includes identification information of a channel and magnetic field intensity change data corresponding to the identification information; and the locating identification information of a target channel from multiple channels included in a rack of the resource management terminal based on the magnetic field intensity change data includes the following: matching the magnetic field intensity change data with magnetic field intensity change data in the channel list; and if the channel list includes magnetic field intensity change data that matches the magnetic field intensity change data, determining that a channel corresponding to the magnetic field intensity change data that matches the magnetic field intensity change data is the target channel.

Optionally, the method further includes the following: displaying a predetermined interaction interface, where the interaction interface is used to request to grant a resource transfer permission to the user; and sending an authorization instruction to the resource management terminal if a confirmation operation of the user is detected.

An implementation of the present specification further provides a resource transfer method, including the following: receiving, by a resource management terminal, a selection instruction sent by a mobile terminal, where the selection instruction includes identification information of a target channel, and the identification information of the target channel is determined by the magnetic field intensity change data of the resource management terminal that is sensed within a predetermined range by the mobile terminal; and sending a resource transfer request to a server, where the resource transfer request includes identification information of a user, identification information of the resource management terminal, and the identification information of the target channel, so that the server determines, based on the identification information of the target channel, a target resource selected by the user, and performs resource transfer of the target resource based on the identification information of the user and the identification information of the resource management terminal.

Optionally, the method further includes the following: receiving a query request sent by the mobile terminal, where the query request includes the identification information of the user; and returning a channel list to the mobile terminal in response to the query request.

Optionally, the method further includes the following: transmitting a Bluetooth signal and/or a Wi-Fi signal; and establishing a connection to the mobile terminal when receiving a connection request sent by the mobile terminal.

Optionally, before the sending a resource transfer request to a server, the method further includes the following: receiving an authorization instruction sent by the mobile terminal, where the authorization instruction is used to instruct to grant a resource transfer permission to the user; and sending the authorization instruction to the server.

An implementation of the present specification further provides a resource transfer method, including the following: receiving, by a server, a resource transfer request sent by a resource management terminal, where the resource transfer request includes identification information of a user, identification information of the resource management terminal, and identification information of a target channel of the resource management terminal; locating a corresponding resource from a resource list of the resource management terminal based on the identification information of the target channel, as a target resource selected by the user; and performing resource transfer of the target resource based on the identification information of the user and the identification information of the resource management terminal.

Optionally, the method further includes the following: receiving an authorization instruction sent by the resource management terminal, where the authorization instruction is used to grant a resource transfer permission of the user to the server; and the performing resource transfer of the target resource based on the identification information of the user and the identification information of the resource management terminal includes the following: determining a value amount of the target resource; transferring the user's resource that is equivalent to the value amount based on the identification information of the user and the authorization instruction; and sending instruction information to the resource management terminal based on the identification information of the resource management terminal, where the instruction information is used to instruct the resource management terminal to transfer the target resource to the user.

An implementation of the present specification further provides a resource selection method, including the following: obtaining magnetic field intensity change data of a resource management terminal that is sensed by a mobile terminal within a predetermined range of the resource management terminal; locating identification information of a target resource from a resource list of the resource management terminal based on the magnetic field intensity change data; and sending a selection instruction to the resource management terminal, where the selection instruction includes the identification information of the target resource, and is used to confirm a target resource selected by a user.

Optionally, the method further includes the following: displaying a predetermined interaction interface, where the interaction interface is used to request to grant a resource transfer permission to the user; and sending an authorization instruction to the resource management terminal if a confirmation operation of the user is detected.

An implementation of the present specification further provides a resource selection method, including the following: receiving, by a resource management terminal, a selection instruction sent by a mobile terminal, where the selection instruction includes identification information of a target resource, and the identification information of the target resource is determined by the magnetic field intensity change data of the resource management terminal that is sensed within a predetermined range by the mobile terminal; and determining, based on the identification information of the target resource, a resource selected by a user.

Optionally, the method further includes the following: sending a resource transfer request to a server, where the resource transfer request includes identification information of the user, identification information of the resource management terminal, and the identification information of the target resource; and performing, by the server, resource transfer of the target resource based on the identification information of the user and the identification information of the resource management terminal.

Optionally, the method further includes the following: receiving an authorization instruction sent by the mobile terminal, where the authorization instruction is used to instruct to grant a resource transfer permission to the user; and sending the authorization instruction to the server.

An implementation of the present specification further provides a resource transfer method, including the following: receiving a resource transfer request sent by a resource management terminal, where the resource transfer request includes identification information of a user, identification information of the resource management terminal, and identification information of a target resource of the resource management terminal; and performing resource transfer of the target resource based on the identification information of the user and the identification information of the resource management terminal.

Optionally, the method further includes the following: receiving an authorization instruction sent by the resource management terminal, where the authorization instruction is used to grant a resource transfer permission of the user to the server; and the performing resource transfer of the target resource based on the identification information of the user and the identification information of the resource management terminal includes the following: determining a value amount of the target resource; transferring the user's resource corresponding to the value amount based on the identification of the user and the authorization instruction; and sending instruction information to the resource management terminal based on the identification information of the resource management terminal, where the instruction information is used to instruct the resource management terminal to transfer the target resource to the user.

An implementation of the present specification further provides an automatic vending method, including the following: determining, by a mobile terminal, identification information of a target channel of a vending machine based on magnetic field intensity change data of the vending machine sensed when approaching the vending machine, and sending the identification information of the target channel to the vending machine; sending, by the vending machine, a resource transfer request to a merchant server, where the resource transfer request includes identification information of a user, identification information of the vending machine, and the identification information of the target channel; and determining, by the merchant server based on the identification information of the target channel, a target product selected by the user, and trading the target product based on the identification information of the user and the identification information of the vending machine.

An implementation of the present specification further provides a resource selection apparatus, including the following: an acquisition module, configured to obtain magnetic field intensity change data of a resource management terminal that is sensed by a mobile terminal within a predetermined range of the resource management terminal; a query module, configured to locate identification information of a target channel from multiple channels included in a rack of the resource management terminal based on the magnetic field intensity change data; and a first sending module, configured to send a selection instruction to the resource management terminal, where the selection instruction includes the identification information of the target channel, and is used to confirm a target resource selected by a user.

Optionally, the apparatus further includes the following: a second sending module, configured to send a query request to the resource management terminal, where the query request includes identification information of the user; and a receiving module, configured to receive a channel list returned by the resource management terminal in response to the query request.

Optionally, the apparatus further includes the following: a third sending module, configured to send a connection request to the resource management terminal when obtaining, through scanning, a Bluetooth signal and/or a Wi-Fi signal sent by the resource management terminal.

Optionally, the channel list includes identification information of a channel, and magnetic field intensity change data corresponding to the identification information; and the query module is configured to: match the magnetic field intensity change data with magnetic field intensity change data in the channel list; and if the channel list includes magnetic field intensity change data that matches the magnetic field intensity change data, determine that a channel corresponding to the magnetic field intensity change data that matches the magnetic field intensity change data is the target channel.

Optionally, the apparatus further includes the following: a display module, configured to display a predetermined interaction interface, where the interaction interface is used to request to grant a resource transfer permission to the user; and a fourth sending module, configured to send an authorization instruction to the resource management terminal if a confirmation operation of the user is detected.

An implementation of the present specification further provides a resource transfer apparatus, including the following: a first receiving module, configured to receive a selection instruction sent by a mobile terminal, where the selection instruction includes identification information of a target channel, and the identification information of the target channel is determined by the magnetic field intensity change data of a resource management terminal that is sensed within a predetermined range by the mobile terminal; and a first sending module, configured to send a resource transfer request to a server, where the resource transfer request includes identification information of a user, identification information of the resource management terminal, and the identification information of the target channel, so that the server determines, based on the identification information of the target channel, a target resource selected by the user, and performs resource transfer of the target resource based on the identification information of the user and the identification information of the resource management terminal.

Optionally, the apparatus further includes the following: a second receiving module, configured to receive a query request sent by the mobile terminal, where the query request includes the identification information of the user; and a second sending module, configured to return a channel list to the mobile terminal in response to the query request.

Optionally, the apparatus further includes the following: a communications module, configured to transmit a Bluetooth signal and/or a Wi-Fi signal; and establish a connection to the mobile terminal when receiving a connection request sent by the mobile terminal.

Optionally, the apparatus further includes the following: a third receiving module, configured to receive an authorization instruction sent by the mobile terminal, where the authorization instruction is used to instruct to grant a resource transfer permission to the user; and a third sending module, configured to send the authorization instruction to the server.

An implementation of the present specification further provides a resource transfer apparatus, including the following: a first receiving module, configured to receive a resource transfer request sent by a resource management terminal, where the resource transfer request includes identification information of a user, identification information of the resource management terminal, and identification information of a target channel of the resource management terminal; a query module, configured to locate a corresponding resource from a resource list of the resource management terminal based on the identification information of the target channel, as a target resource selected by the user; and a resource transfer module, configured to perform resource transfer of the target resource based on the identification information of the user and the identification information of the resource management terminal.

Optionally, the apparatus further includes the following: a second receiving module, configured to receive an authorization instruction sent by the resource management terminal, where the authorization instruction is used to grant a resource transfer permission of the user to the server; and the resource transfer module is configured to determine a value amount of the target resource; transfer the user's resource that is equivalent to the value amount based on the identification of the user and the authorization instruction; and send instruction information to the resource management terminal based on the identification information of the resource management terminal, where the instruction information is used to instruct the resource management terminal to transfer the target resource to the user.

An implementation of the present specification further provides a resource selection apparatus, including the following: an acquisition module, configured to obtain magnetic field intensity change data of a resource management terminal that is sensed by a mobile terminal within a predetermined range of the resource management terminal; a query module, configured to locate identification information of a target resource from a resource list of the resource management terminal based on the magnetic field intensity change data; and a first sending module, configured to send a selection instruction to the resource management terminal, where the selection instruction includes the identification information of the target resource, and is used to confirm a target resource selected by a user.

Optionally, the apparatus further includes the following: a display module, configured to display a predetermined interaction interface, where the interaction interface is used to request to grant a resource transfer permission to the user; and a second sending module, configured to send an authorization instruction to the resource management terminal if a confirmation operation of the user is detected.

An implementation of the present specification further provides a resource selection apparatus, including the following: a first receiving module, configured to receive a selection instruction sent by a mobile terminal, where the selection instruction includes identification information of a target resource, and the identification information of the target resource is determined by the magnetic field intensity change data of the resource management terminal that is sensed within a predetermined range by the mobile terminal; and a determining module, configured to determine, based on the identification information of the target resource, a resource selected by a user.

Optionally, the apparatus further includes the following: a first sending module, configured to send a resource transfer request to a server, where the resource transfer request includes identification information of the user, identification information of the resource management terminal, and the identification information of the target resource; and the server performs resource transfer of the target resource based on the identification information of the user and the identification information of the resource management terminal.

Optionally, the apparatus further includes the following: a second receiving module, configured to receive an authorization instruction sent by the mobile terminal, where the authorization instruction is used to instruct to grant a resource transfer permission to the user; and a second sending module, configured to send the authorization instruction to the server.

An implementation of the present specification further provides a resource transfer apparatus, including the following: a first receiving module, configured to receive a resource transfer request sent by a resource management terminal, where the resource transfer request includes identification information of a user, identification information of the resource management terminal, and identification information of a target resource of the resource management terminal; and a resource transfer module, configured to perform resource transfer of the target resource based on the identification information of the user and the identification information of the resource management terminal.

Optionally, the apparatus further includes the following: a second receiving module, configured to receive an authorization instruction sent by the resource management terminal, where the authorization instruction is used to grant a resource transfer permission of the user to the server; and the resource transfer module is configured to determine a value amount of the target resource; transfer the user's resource corresponding to the value amount based on the identification of the user and the authorization instruction; and send instruction information to the resource management terminal based on the identification information of the resource management terminal, where the instruction information is used to instruct the resource management terminal to transfer the target resource to the user.

An implementation of the present specification further provides an automatic vending system, including the following: a mobile terminal, configured to determine identification information of a target channel of a vending machine based on magnetic field intensity change data of the vending machine sensed when approaching the vending machine, and send the identification information of the target channel to the vending machine; the vending machine, configured to send a resource transfer request to a merchant server, where the resource transfer request includes identification information of a user, identification information of the vending machine, and the identification information of the target channel; and the merchant server, configured to determine, based on the identification information of the target channel, a target product selected by the user, and trade the target product based on the identification information of the user and the identification information of the vending machine.

An implementation of the present specification further provides an electronic device, including the following: a processor; and a memory, configured to store a computer executable instruction, where when executed, the executable instruction enables the processor to perform the following operations: obtaining magnetic field intensity change data of a resource management terminal that is sensed by a mobile terminal within a predetermined range of the resource management terminal; locating identification information of a target channel from multiple channels included in a rack of the resource management terminal based on the magnetic field intensity change data; and sending a selection instruction to the resource management terminal, where the selection instruction includes the identification information of the target channel, and is used to confirm a target resource selected by a user.

An implementation of the present specification further provides an electronic device, including the following: a processor; and a memory, configured to store a computer executable instruction, where when executed, the executable instruction enables the processor to perform the following operations: receiving a selection instruction sent by a mobile terminal, where the selection instruction includes identification information of a target channel, and the identification information of the target channel is determined by the magnetic field intensity change data of a resource management terminal that is sensed within a predetermined range by the mobile terminal; and sending a resource transfer request to a server, where the resource transfer request includes identification information of a user, identification information of the resource management terminal, and the identification information of the target channel, so that the server determines, based on the identification information of the target channel, a target resource selected by the user, and performs resource transfer of the target resource based on the identification information of the user and the identification information of the resource management terminal.

An implementation of the present specification further provides an electronic device, including the following: a processor; and a memory, configured to store a computer executable instruction, where when executed, the executable instruction enables the processor to perform the following operations: receiving a resource transfer request sent by a resource management terminal, where the resource transfer request includes identification information of a user, identification information of the resource management terminal, and identification information of a target channel of the resource management terminal; locating a corresponding resource from a resource list of the resource management terminal based on the identification information of the target channel, as a target resource selected by the user; and performing resource transfer of the target resource based on the identification information of the user and the identification information of the resource management terminal.

An implementation of the present specification further provides an electronic device, including the following: a processor; and a memory, configured to store a computer executable instruction, where when executed, the executable instruction enables the processor to perform the following operations: obtaining magnetic field intensity change data of a resource management terminal that is sensed by a mobile terminal within a predetermined range of the resource management terminal; locating identification information of a target resource from a resource list of the resource management terminal based on the magnetic field intensity change data; and sending a selection instruction to the resource management terminal, where the selection instruction includes the identification information of the target resource, and is used to confirm a target resource selected by a user.

An implementation of the present specification further provides an electronic device, including the following: a processor; and a memory, configured to store a computer executable instruction, where when executed, the executable instruction enables the processor to perform the following operations: receiving a selection instruction sent by a mobile terminal, where the selection instruction includes identification information of a target resource, and the identification information of the target resource is determined by the magnetic field intensity change data of the resource management terminal that is sensed within a predetermined range by the mobile terminal; and determining, based on the identification information of the target resource, a resource selected by a user.

An implementation of the present specification further provides an electronic device, including the following: a processor; and a memory, configured to store a computer executable instruction, where when executed, the executable instruction enables the processor to perform the following operations: receiving a resource transfer request sent by a resource management terminal, where the resource transfer request includes identification information of a user, identification information of the resource management terminal, and identification information of a target resource of the resource management terminal; and performing resource transfer of the target resource based on the identification information of the user and the identification information of the resource management terminal.

The previous at least one technical solution used in the implementations of the present specification can achieve the following beneficial effects:

The user moves the mobile terminal into a vicinity of the target resource in the resource management terminal. The mobile terminal senses the magnetic field intensity change data of the resource management terminal at the location by using the magnetic field sensor, and then determines the target channel of the resource management terminal at the location based on the magnetic field intensity change data, and informs the resource management terminal of the target channel, so as to determine the resource selected by the user. It has advantages of convenience and quickness in comparison with the existing technology in which the user needs to press physical keys or perform a selection operation on the touchscreen of the resource management terminal.

BRIEF DESCRIPTION OF DRAWINGS

The accompanying drawings described here are intended to provide a further understanding of the present application, and constitute a part of the present application. The example implementations of the present application and the descriptions of the example implementations are intended to explain the present application, and do not constitute an undue limitation on the present application. In the drawings.

DESCRIPTION OF IMPLEMENTATIONS

To make the objectives, technical solutions, and advantages of the present application clearer, the following clearly describes the technical solutions of the present application with reference to specific implementations and accompanying drawings of the present application. Clearly, the described implementations are merely some rather than all of the implementations of the present application. All other implementations obtained by a person of ordinary skill in the art based on the implementations of the present application without creative efforts shall fall within the protection scope of the present application.

As stated in the background section, when a user needs to purchase a product on a vending machine, the user needs to press a physical key corresponding to the product on the vending machine, or make selection through tapping on a touchscreen of the vending machine to indicate the selected product. However, the existing technology requires the user's manual operations, which is inconvenient and is not fast enough.

In view of the previous description, the present specification provides a resource selection method. The mobile terminal is moved into a vicinity of the target resource in the resource management terminal. The mobile terminal senses the magnetic field intensity change data of the resource management terminal at the location by using the magnetic field sensor, and then determines the target channel of the resource management terminal at the location based on the magnetic field intensity change data, and informs the resource management terminal of the target channel, so as to determine the resource selected by the user. Such process does not require the user to perform manual operations pressing and tapping, and has advantages of convenience and quickness.

In addition, it is worthwhile to note that, although the previous description uses "product" and "vending machine" as examples to introduce the disadvantages of the existing technology, a person skilled in the art can easily understand that the resources in the present application include but are not limited to: multimedia files (e.g., video files, audio files, dynamic pictures, etc.), character messages, account balance, virtual articles, resource redeem codes, etc. Similarly, the resource management terminal in the present application includes but is not limited to a vending machine or a package delivery locker. For ease of description, "product" and "vending machine" are used as examples in the following.

Figure 2:
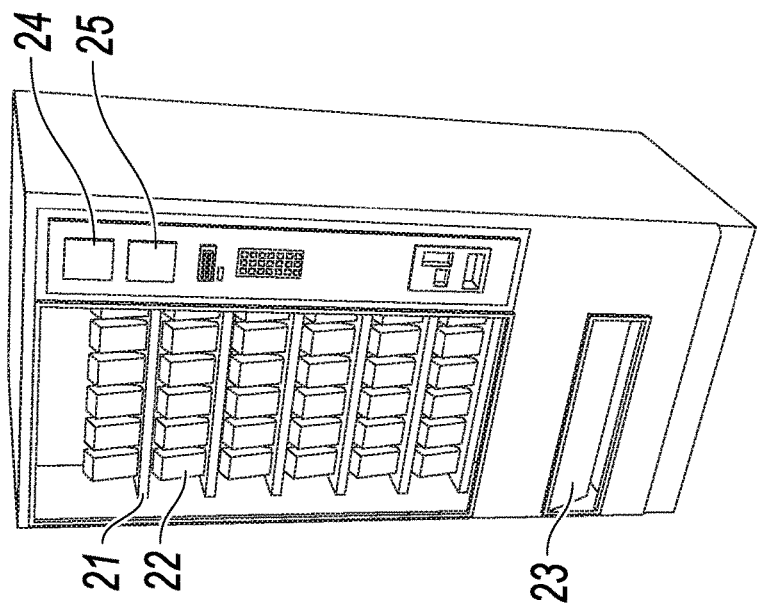
FIG. 2 is a schematic structural diagram illustrating a vending machine, according to an implementation of the present specification.
Figure 1:
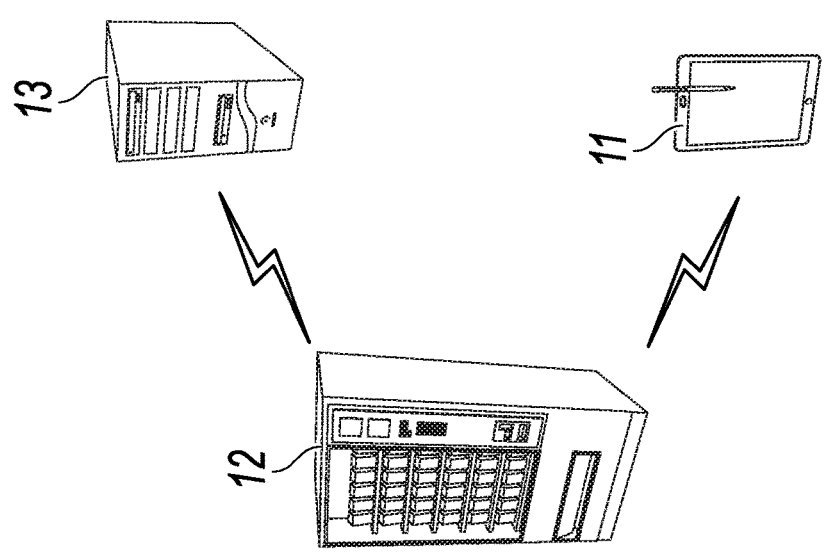
FIG. 1 is a schematic diagram illustrating an application scenario, according to an implementation of the present specification.

The following describes examples of application scenarios in the present application with reference to FIG. 1 and FIG. 2.

A first application scenario can be as follows:

A resource management terminal 12 transmits a Bluetooth signal and/or a Wireless Fidelity (Wi-Fi) signal. When a user's mobile terminal 11 approaches the resource management terminal 12 and falls within a first predetermined range, the mobile terminal 11 can detect the resource management terminal 12, and establish a connection to the resource management terminal 12 based on the user's needs. Then, the user moves the mobile terminal 11 into a vicinity of a selected product until the mobile terminal 11 falls within a second predetermined range. The mobile terminal 11 senses magnetic field intensity change data of a magnetic field created by the resource management terminal 12 at the location, determines identification information of a channel at the location based on the magnetic field intensity change data, and then returns the identification information of the channel to the resource management terminal 12, so as to determine the resource selected by the user.

Further, the resource management terminal 12 initiates a resource transfer request to a server 13, so that the server 13 determines, in response to the resource transfer request and based on the identification information of the channel, the resource selected by the user, and performs resource transfer of the resource.

A second application scenario can be as follows:

A resource management terminal 12 transmits a Bluetooth signal and/or a Wi-Fi signal. When a user's mobile terminal 11 approaches the resource management terminal 12 and falls within a first predetermined range, the mobile terminal 11 can detect the resource management terminal 12, and establish a connection to the resource management terminal 12 based on the user's needs. Then, the user moves the mobile terminal 11 into a vicinity of a selected product until the mobile terminal 11 falls within a second predetermined range. The mobile terminal 11 senses magnetic field intensity change data of a magnetic field created by the resource management terminal 12 at the location, determines identification information of a resource at the location based on the magnetic field intensity change data, and then returns the identification information of the resource to the resource management terminal 12, so as to determine the resource selected by the user.

Further, the resource management terminal 12 initiates a resource transfer request to a server 13, so that the server 13 performs resource transfer of the resource in response to the resource transfer request.

With reference to FIG. 2, a third application scenario can be as follows:

Corresponding locations of products 22 displayed in the vending machine are arranged with magnetic fields 21, and magnetic fields 21 corresponding to different products 22 have different magnetic field intensity change rules. Moreover, a Bluetooth module 24/Wi-Fi module 25 of the vending machine transmits a Bluetooth signal/Wi-Fi signal. A user can enable Bluetooth and/or Wi-Fi of a mobile terminal, and if the mobile terminal is located within a first predetermined range of the vending machine, the mobile terminal can detect and connect to the vending machine. Then, the user browses the products displayed in the vending machine. If the user wants a certain product, the user can move the mobile terminal into a vicinity of the product until the mobile terminal falls within a second predetermined range to detect magnetic field intensity change data of a magnetic field corresponding to the product, and can further determine identification information of a channel corresponding to the product or directly determine identification information of the product. Then the mobile terminal sends the channel information corresponding to the product or the identification information of the product to the vending machine, so as to determine the product selected by the user.

Further, the vending machine can initiate a request for a transaction with the mobile terminal to a merchant server. Correspondingly, the merchant server deducts funds in response to the request, and instructs the vending machine to deliver the product after funds deduction is successful, so as to complete the transaction.

A fourth application scenario can be as follows:

Corresponding locations of parcels under control of a parcel management terminal (usually disposed at a pick-up location) of a parcel station are arranged with magnetic fields, and magnetic fields 21 corresponding to different parcels have different magnetic field intensity change rules. Moreover, a Bluetooth module 24/Wi-Fi module 25 of the vending machine transmits a Bluetooth signal/Wi-Fi signal. If a user wants to pick up a parcel, the user can enable Bluetooth and/or Wi-Fi of a mobile terminal, and if the mobile terminal is located within a first predetermined range of the parcel management terminal, the mobile terminal can detect and connect to the parcel management terminal. Then the user locates a corresponding locker in a parcel locker cabinet based on prompt information (e.g., a locker number of the parcel locker cabinet) sent by a parcel management server. Then, the user moves the mobile terminal into a vicinity of the locker until the mobile terminal falls within a second predetermined range to sense magnetic field intensity change data near the locker. Then the mobile terminal determines identification information of the locker where the parcel is placed, and sends the identification information to the parcel management terminal. The parcel management terminal or the parcel management server checks whether pre-stored user information (e.g., a recipient) is consistent with identification information of the user who sends the identification information of the locker, and if yes, unlocks the locker.

In addition, in the case of delivery fee to be collected, the parcel management server charges the user, and after the funds deduction is successful, instructs the parcel management terminal to unlock the locker.

In the previously described four application scenarios, the first predetermined range can be set based on the coverage of the Bluetooth module and/or the Wi-Fi module, and can be usually set to 10 m. The second predetermined range can be set based on the coverage of the magnetic field, and can be usually set to 10 cm. A specific setting method is not limited here.

The mobile terminal or mobile communications terminal refers to a computer device that can be used during movement, and in a broad sense, includes a mobile phone, a laptop, a tablet computer, a POS terminal, or even a vehicle-mounted computer. However, in most cases, the mobile terminal refers to a mobile phone, or a smartphone and a tablet computer having multiple application functions.

The following describes in detail the technical solutions provided in the implementations of the present application with reference to the accompanying drawings.

Implementation 1

Figure 3:
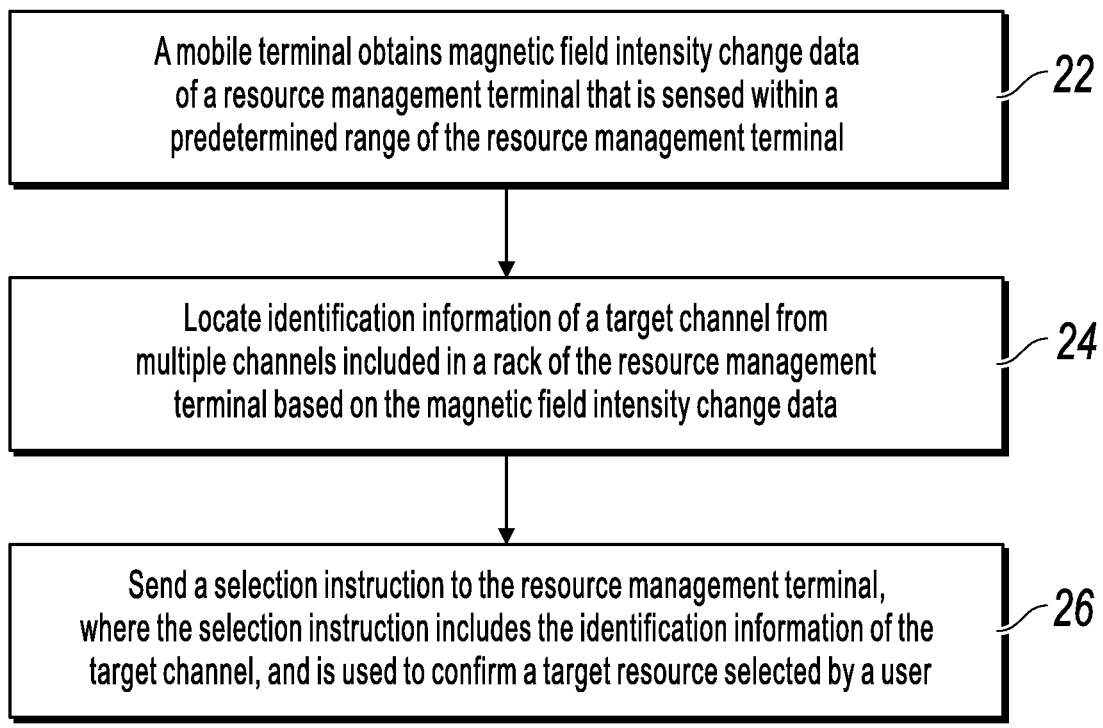
FIG. 3 is a schematic flowchart illustrating a resource selection method, according to implementation 1 of the present specification.

FIG. 3 is a schematic flowchart illustrating a resource selection method, according to an implementation of the present specification. Referring to FIG. 3, the method can be performed by a mobile terminal 11 in FIG. 1, and can include the following steps:

22. Obtain magnetic field intensity change data of a resource management terminal that is sensed by a mobile terminal within a predetermined range of the resource management terminal.

It is worthwhile to note that, a first implementation of step 22 can be as follows:

With reference to FIG. 1 and FIG. 2, a user browses products displayed in a resource management terminal 12. If the user wants to purchase beverage A, the user moves a mobile terminal 11 into a vicinity of beverage A in the resource management terminal 12 until the mobile terminal 11 falls within a predetermined range (e.g., 10 cm). Then, a magnetic field sensor of the mobile terminal 11 senses magnetic field intensity change at the location to obtain corresponding magnetic field intensity change data.

24. Locate identification information of a target channel from multiple channels included in a rack of the resource management terminal based on the magnetic field intensity change data.

Before step 24 is performed, the method further includes a step of obtaining a channel list from the resource management terminal, which can be as follows: sending a query request to the resource management terminal, where the query request includes identification information of the user; and receiving a channel list returned by the resource management terminal in response to the query request. The channel list includes at least identification information of each channel (e.g., a channel number) and corresponding magnetic field intensity change data. The magnetic field intensity change data corresponds to different magnetic field change rules corresponding to different products in the third application scenario. For example, magnetic field change rule 1 corresponds to channel 1, magnetic field change rule 2 corresponds to channel 2, . . . , and magnetic field change rule n corresponds to channel n.

It is not difficult to understand that, a magnetic field corresponding to each resource and its corresponding magnetic field change rule are maintained by the resource management terminal. An implementation includes but is not limited to: creating a magnetic field of a predetermined magnetic field change rule by changing an electric field that forms electromagnetism, for example, constructing an oscillation circuit, so that when the oscillation circuit generates an oscillation current, charges on a capacitor plate, currents passing through a coil, and magnetic fields associated with the charges change periodically, and such process is called electronic oscillation; and then adjusting a period corresponding to a time needed for completing one periodic change of electronic oscillation, and a frequency corresponding to the quantity of periodic changes completed within 1 s, so as to form a predetermined magnetic field change rule.

Based on the previous description, with reference to FIG. 4, a first implementation of step 24 can be as follows:

Step 42: Match the magnetic field intensity change data with magnetic field intensity change data in the channel list.

Step 44: Determine whether the channel list includes matched magnetic field intensity change data.

If yes, step 46 is performed. Otherwise, the step ends.

Step 46: Determine identification information of a channel corresponding to the magnetic field intensity change data that matches the magnetic field intensity change data.

Step 48: Use the channel corresponding to the identification information as the target channel selected by the user.

For step 42 and step 44, it is worthwhile to note that, if the detected magnetic field intensity change data is "strong-weak-weak-strong", the channel list is searched to check whether there is magnetic field intensity change data (a magnetic field change rule) corresponding to "strong-weak-weak-strong". If yes, the channel corresponding to the magnetic field intensity change data is determined.

In addition, it is not difficult to understand that, as the distance between the mobile terminal and the magnetic field changes, the sensed magnetic field intensity value is unstable, but its magnetic field change rule is determinable. Therefore, a mapping relationship between the magnetic field intensity change rule and the channel is established here, so that magnetic field change scheme is used to identify the channel, so as to alleviate transaction error caused by forging a magnetic field by a malicious person.

26. Send a selection instruction to the resource management terminal, where the selection instruction includes the identification information of the target channel, and is used to confirm a target resource selected by a user.

It is worthwhile to note that, a first implementation of step 26 can be as follows:

When the user selects a product, the resource management terminal does not know which product the user selects. Therefore, after determining a target channel corresponding to the product, the mobile terminal needs to send a selection instruction that includes identification information of the target channel to the resource management terminal, so as to inform the resource management terminal.

Correspondingly, the resource management terminal determines, based on the identification information of the target channel, the target resource selected by the user.

A second implementation of step 26 can be as follows:

Unlike the first implementation, after receiving the selection instruction sent by the mobile terminal, the resource management terminal adds the selection instruction to a resource transfer request and sends it to a server, and the server determines the target resource selected by the user.

It can be seen that in the present implementation, the user moves the mobile terminal into a vicinity of the target resource in the resource management terminal. The mobile terminal senses the magnetic field intensity change data of the resource management terminal at the location by using the magnetic field sensor, and then determines the target channel of the resource management terminal at the location based on the magnetic field intensity change data, and informs the resource management terminal of the target channel, so as to determine the resource selected by the user. It has advantages of convenience and quickness in comparison with the existing technology in which the user needs to press physical keys or perform a selection operation on the touchscreen of the resource management terminal.

Implementation 2

Figure 5:
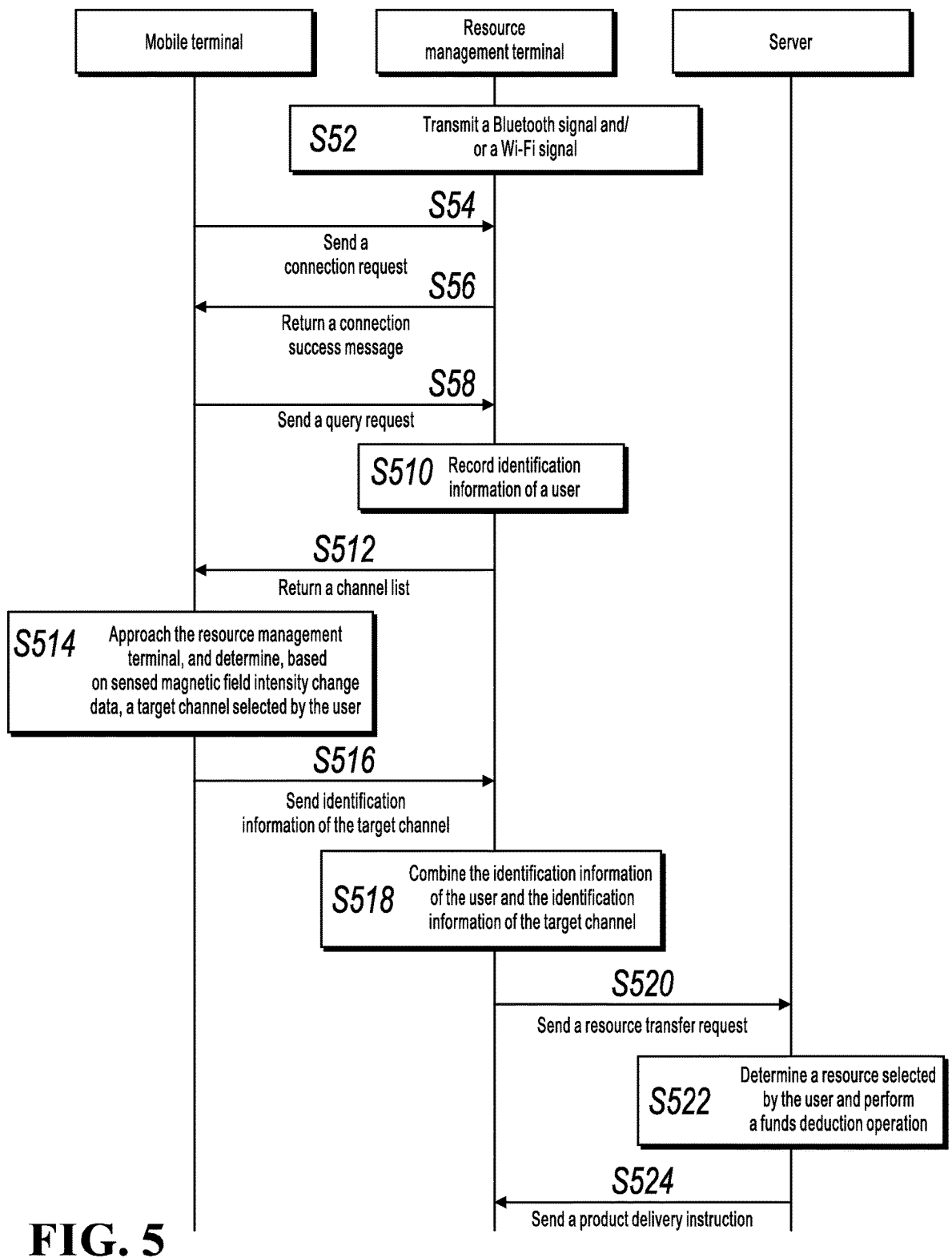
FIG. 5 is a schematic flowchart illustrating a resource transfer method, according to implementation 2 of the present specification.

FIG. 5 is a schematic flowchart illustrating a resource transfer method, according to implementation 2 of the present specification. Referring to FIG. 5, the method can include the following steps:

Step 52: A resource management terminal transmits a Bluetooth signal and/or a Wi-Fi signal.

Step 54: A mobile terminal sends a connection request to the resource management terminal.

Step 56: The resource management terminal returns a connection success message (optional).

It is worthwhile to note that, step 52 to step 56 form a first stage (connection stage) of the method. With reference to FIG. 2, the Bluetooth module 24 transmits a Bluetooth Low Energy (BLE) broadcast, and/or the Wi-Fi module 25 sends a Wi-Fi signal. A coverage radius of each of the Bluetooth module 24 and the Wi-Fi module 25 is generally greater than 10 m.

If the user wants to search for a vending machine nearby (e.g., a certain subway station or a certain crossroad), the user can enable the Bluetooth or Wi-Fi function to scan whether there is a BLE broadcast or a Wi-Fi signal, and if yes, automatically establish a connection to the vending machine. In addition, a prompt message indicating "connection success" is selectively displayed to the user.

Step 58: The mobile terminal sends a query request to the resource management terminal.

Step 510: The resource management terminal records the identification information of the user.

Step 512: Return a channel list to the mobile terminal.

It is worthwhile to note that, step 58 to step 512 form a second stage (query stage) of the method. With reference to FIG. 2, after the connection, a back-end of the mobile terminal sends a query request to the vending machine, where the query request includes the identification information of the user, such as an account number, a mobile phone number, etc. The vending machine records the identification information of the user, and can synchronously return the channel list to the mobile terminal.

Step 514: The mobile terminal approaches the resource management terminal, and determines, based on sensed magnetic field intensity change data, a target channel selected by the user.

Step 516: Send identification information of the target channel to the resource management terminal.

It is worthwhile to note that, step 514 and step 516 form a third stage (user's selection stage) of the method. With reference to FIG. 2, the user browses the products displayed in the vending machine, and if the user needs to purchase product A 22, the user moves the mobile terminal into a vicinity of the product 22 until the mobile terminal falls within a predetermined range (e.g., 10 cm), so as to sense magnetic field intensity change data corresponding to a channel of the product 22. The mobile terminal matches the sensed magnetic field intensity change data with magnetic field intensity change data in the channel list, to locate the identification information of the target channel, and informs the vending machine of the identification information, so that the vending machine determines the identification information of the target channel selected by the user.

Step 518: The resource management terminal combines the identification information of the user and the identification information of the target channel.

Step 520: Send a resource transfer request to a server.

Step 522: The server determines the resource selected by the user and performs a funds deduction operation.

Step 524: Send a product delivery instruction to the resource management terminal.

It is worthwhile to note that, step 518 to step 524 form a fourth stage (transaction stage) of the method. With reference to FIG. 2, the vending machine adds the identification information of the user, the identification information of the target channel, and the identification information of the vending channel to a transaction request, and sends the transaction request to the server. The server determines the resource selected by the user and its price from a data list of the vending machine based on the identification information of the target channel, and performs a funds deduction operation on the user based on the identification information of the user. After the funds deduction is completed, the server sends a product delivery instruction to the vending machine based on the identification information of the vending machine. After receiving the product delivery instruction, the vending machine controls its mechanical device to convey product A to the delivery port 23 to complete the transaction.

The resource list stores a mapping relationship between a channel and a resource, for example, product 1 is placed on channel 1, and product 2 is placed on channel 2.

A first implementation of the funds deduction operation in step 522 can be as follows:

After completing the connection, or before sending the target channel, the mobile terminal displays a predetermined interaction interface, where the interaction interface is used to request to grant a resource transfer permission to the user. If a confirmation operation of the user is detected, the mobile terminal sends an authorization instruction to the resource management terminal. The resource management terminal can add the authorization instruction to the transaction request and send the transaction request to the server.

Thus, the server can first determine a value amount of product A (the target resource), and then automatically transfer the user's resource that is equivalent to the value amount of product A based on the identification information of the user and the authorization instruction, and selectively send prompt information indicating "payment completion" to the user. Then, the server sends instruction information to the vending machine based on the identification information of the vending machine, where the instruction information is used to instruct the vending machine to convey product A to the delivery port 23, so as to transfer product A to the user.

A second implementation can be as follows:

This implementation differs from the first implementation in that at any time point between step 56 and step 520, the vending machine sends an authorization instruction to the mobile terminal to instruct the mobile terminal to display a predetermined interaction interface.

It can be seen that in the present implementation, the resource management terminal sends a Bluetooth signal and/or a Wi-Fi signal to identify itself, and identifies channels by using different magnetic field change rules. As such, when approaching a wanted product, the mobile terminal can sense corresponding magnetic field intensity change data, and then determine identification information of the target channel nearby and inform the resource management terminal of the identification information, so as to determine the product selected by the user. Then the resource management terminal initiates a transaction request to the server, and the server completes a payment operation at a back-end, and instructs the resource management terminal to deliver the product, so as to complete the transaction. Different from the solution in the existing technology in which "product selection" and "payment" are two processes that require the user to perform separate operations, the present implementation only requires the user to move the mobile terminal into a vicinity of the wanted product, so as to perform the "product selection" and "payment" steps at one time, presenting advantages of convenience and quickness, and good user experience.

Implementation 3

Figure 6:
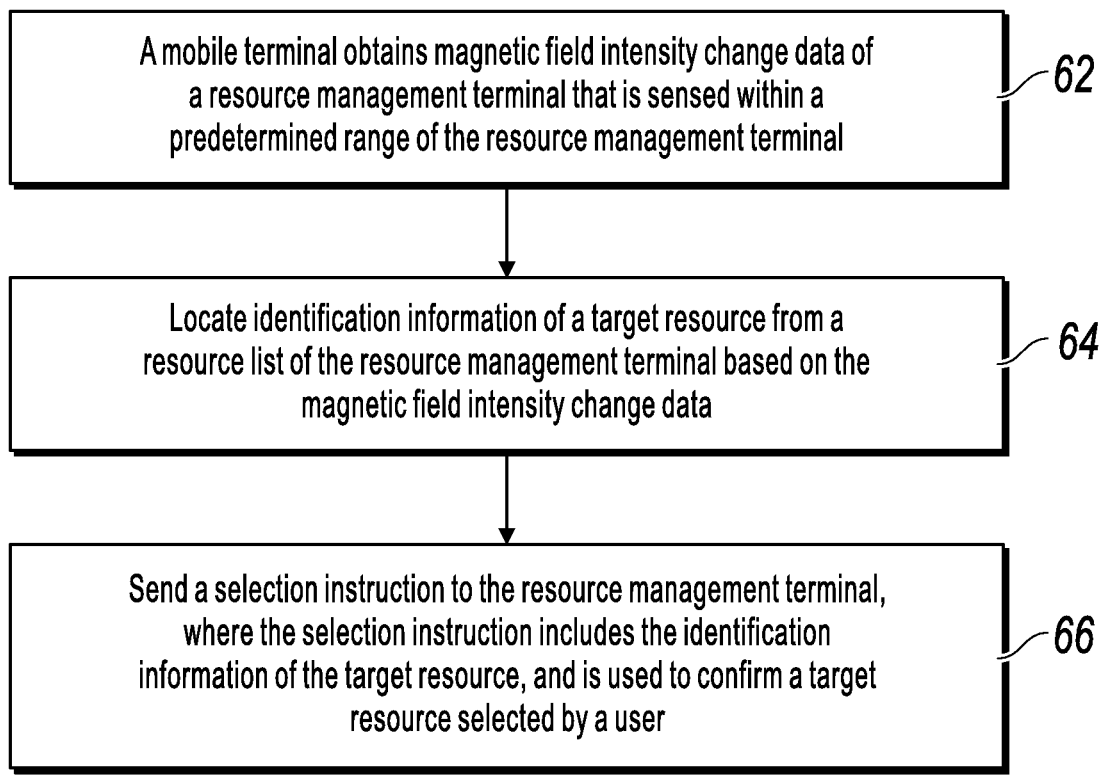
FIG. 6 is a schematic flowchart illustrating a resource selection method, according to implementation 3 of the present specification.

FIG. 6 is a schematic flowchart illustrating a resource transfer method, according to implementation 3 of the present specification. Referring to FIG. 6, the method can be performed by a mobile terminal 11 in FIG. 1, and can include the following steps:

Step 62: Obtain magnetic field intensity change data of a resource management terminal that is sensed by a mobile terminal within a predetermined range of the resource management terminal.

Step 64: Locate identification information of a target resource from a resource list of the resource management terminal based on the magnetic field intensity change data.

Step 66: Send a selection instruction to the resource management terminal, where the selection instruction includes the identification information of the target resource, and is used to confirm a target resource selected by a user.

It is worthwhile to note that, a first implementation of the present implementation can be as follows:

Based on the content described in implementation 1, the difference between the present implementation and implementation 1 lies in that the resource list includes identification information of a resource and corresponding magnetic field intensity change data. Thus, identification information of a corresponding target resource can be located from a resource list of the resource management terminal based on the sensed magnetic field intensity change data, and is sent to the resource management terminal.

A second implementation of the present implementation can be as follows:

Different types of resource management terminals may have different internal hardware layouts, and accordingly, may maintain different resource lists. Specific examples can be as follows:

Example 1: Each resource in the resource management terminal corresponds to its own channels, and the channels corresponding to each resource include a private channel and a shared channel. A product delivery process can be as follows: resource placement location-private channel-shared channel-delivery port. The resource list includes at least the identification information of the resource, identification information of a private channel corresponding to the resource, and magnetic field intensity change data.

Example 2: Some resources in the resource management terminal share one channel, for example, resources at the same layer share one channel. A product delivery process can be as follows: resource placement location-shared channel at the same layer-delivery port. The resource list includes at least the identification information of the resource, identification information of the shared channel at the same layer corresponding to the resource, and magnetic field intensity change information.

Example 3: All resources in the resource management terminal share one channel. A product delivery process can be as follows: resource placement location-shared channel-delivery port. The resource list includes at least the identification information of the resource, and magnetic field intensity change information.

In examples 1 and 2, the identification information of the resource can be 1121, where the first two digits 11 represent a channel number and the last two digits 21 represent a specific resource number. Thus, on one hand, the server can determine the resource to be transferred and the value of the resource based on the resource number; on the other hand, the server can determine the product delivery channel of the resource based on the channel number, and instruct the resource management terminal to convey the resource from the delivery channel corresponding to the channel number.

Thus, in the present implementation, the user moves the mobile terminal into a vicinity of the target resource in the resource management terminal. The mobile terminal senses the magnetic field intensity change data of the resource management terminal at the location by using the magnetic field sensor, and then determines the target resource of the resource management terminal at the location based on the magnetic field intensity change data, and informs the resource management terminal of the target resource, so as to determine the resource selected by the user. It has advantages of convenience and quickness in comparison with the existing technology in which the user needs to press physical keys or perform a selection operation on the touchscreen of the resource management terminal.

Implementation 4

Figure 7:
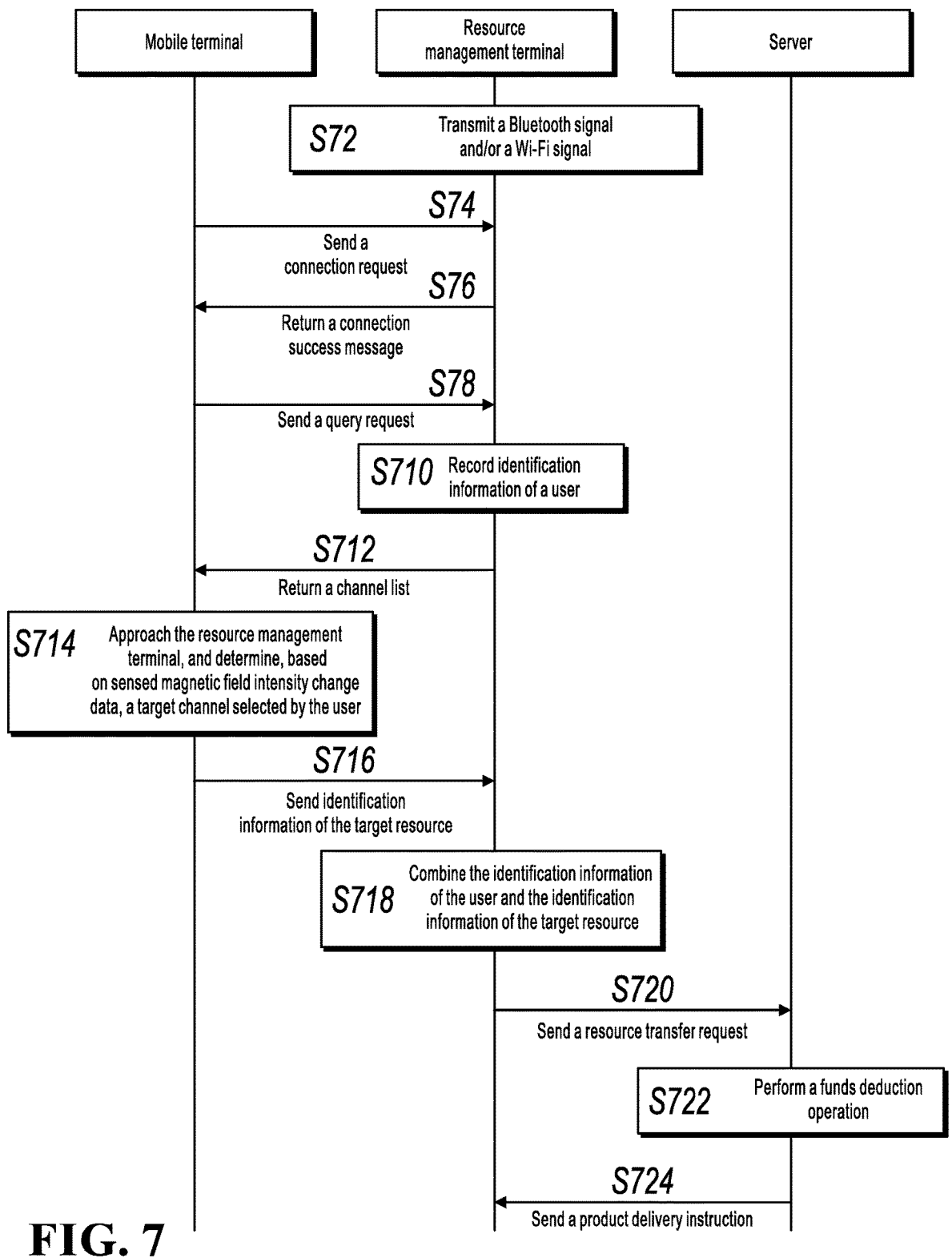
FIG. 7 is a schematic flowchart illustrating a resource transfer method, according to implementation 4 of the present specification.

FIG. 7 is a schematic flowchart illustrating a resource transfer method, according to implementation 4 of the present specification. Referring to FIG. 7, the method can include the following steps:

Step 72: A resource management terminal transmits a Bluetooth signal and/or a Wi-Fi signal.

Step 74: A mobile terminal sends a connection request to the resource management terminal.

Step 76: The resource management terminal returns a connection success message (optional).

It is worthwhile to note that, step 72 to step 76 form a first stage of the method, which is similar to the first stage in implementation 2, and details are omitted here for simplicity.

Step 78: The mobile terminal sends a query request to the resource management terminal.

Step 710: The resource management terminal records the identification information of the user.

Step 712: Return a resource list to the mobile terminal.

It is worthwhile to note that, step 78 to step 713 form a second stage of the method, which differs from the second stage in implementation 2 in that the resource management terminal maintains the mapping relationship between the magnetic field change rule and the resource, i.e., magnetic field change rule 1 corresponds to resource 1, magnetic field change rule 2 corresponds to a resource 2, . . . , and magnetic field change rule n corresponds to resource n.

Thus, the resource list is returned to the mobile terminal based on the query request of the mobile terminal.

Step 714: The mobile terminal approaches the resource management terminal, and determines, based on sensed magnetic field intensity change data, a target resource selected by the user.

Step 716: Send identification information of the target resource to the resource management terminal.

It is worthwhile to note that, step 714 and step 716 form a third stage of the method. The resource management terminal determines, based on the identification information of the target resource sent by the mobile terminal, the resource selected by the user as the target resource.

Step 718: The resource management terminal combines the identification information of the user and the identification information of the target resource.

Step 720: Send a resource transfer request to a server.

Step 722: The server performs a funds deduction operation.

Step 724: Send a product delivery instruction to the resource management terminal.

It is worthwhile to note that, step 718 to step 724 form a fourth stage of the method. The resource transfer request sent by the resource management terminal includes identification information of a user, identification information of the resource management terminal, and identification information of a target resource. The server performs the resource transfer operation, i.e., deducts funds from the user, and instructs the resource management terminal to deliver the product.

A first implementation in which the server performs the resource transfer operation can be as follows:

After completing the connection, or before sending the target channel, the mobile terminal displays a predetermined interaction interface, where the interaction interface is used to request to grant a resource transfer permission to the user. If a confirmation operation of the user is detected, the mobile terminal sends an authorization instruction to the resource management terminal. The resource management terminal can add the authorization instruction to the resource transfer request and send the resource transfer request to the server.

Thus, the server can first determine a value amount of the target resource, and then automatically transfer the user's resource that is equivalent to the value amount of product A (the target resource) based on the identification information of the user and the authorization instruction, and selectively send prompt information indicating "payment completion" to the user. Then, the server sends instruction information to the vending machine based on the identification information of the vending machine, where the instruction information is used to instruct the vending machine to convey the target resource to the delivery port 23, so as to transfer the target resource to the user.

A second implementation can be as follows:

This implementation differs from the first implementation in that at any time point between step 76 and step 720, the vending machine sends an authorization instruction to the mobile terminal to instruct the mobile terminal to display a predetermined interaction interface.

It can be seen that in the present implementation, the resource management terminal sends a Bluetooth signal and/or a Wi-Fi signal to identify itself, and identifies channels by using different magnetic field change rules. As such, when approaching a wanted product, the mobile terminal can sense corresponding magnetic field intensity change data, and then determine identification information of the target resource nearby and inform the resource management terminal of the identification information, so as to determine the product selected by the user. Then the resource management terminal initiates a resource transfer request to the server, and the server completes a payment operation at a back-end, and instructs the resource management terminal to deliver the product, so as to complete the transaction. Different from the solution in the existing technology in which "product selection" and "payment" are two processes that require the user to perform separate operations, the present implementation only requires the user to move the mobile terminal into a vicinity of the wanted product, so as to perform the "product selection" and "payment" steps at one time, presenting advantages of convenience and quickness, and good user experience.

Implementation 5

Figure 8:
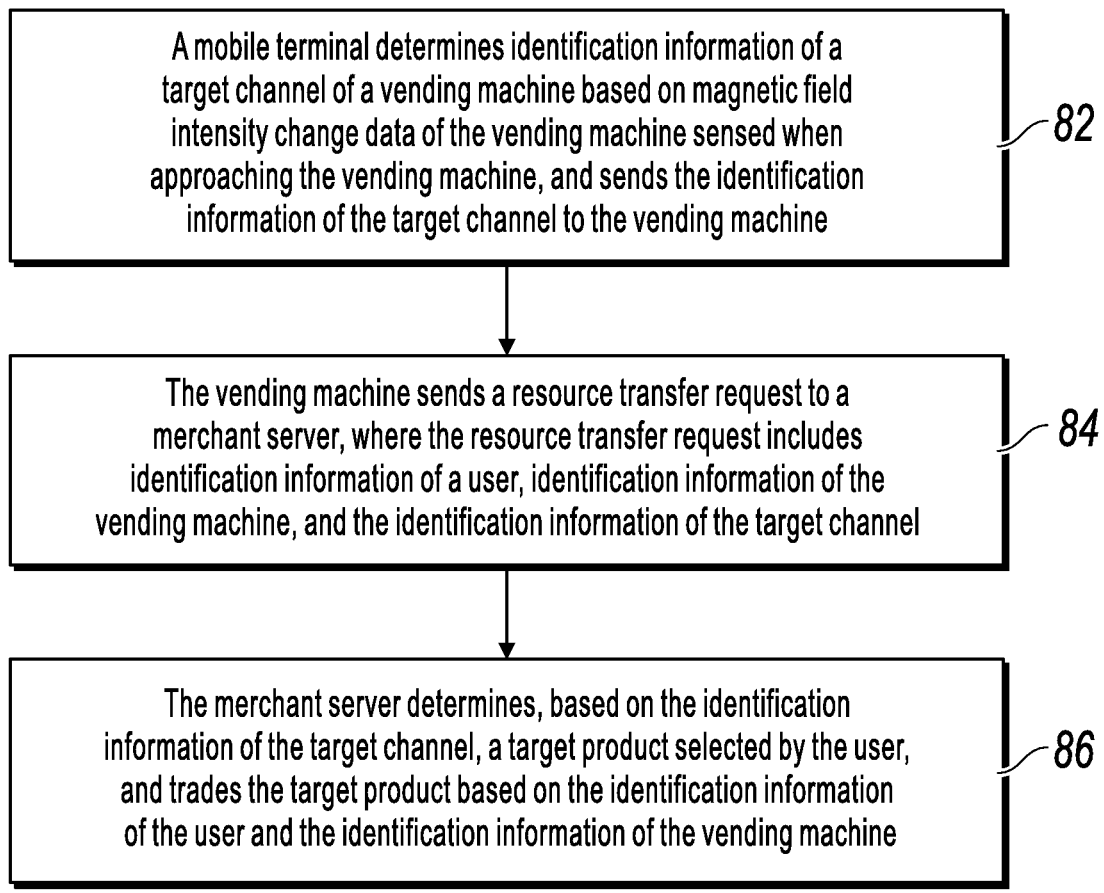
FIG. 8 is a schematic flowchart illustrating an automatic vending method, according to implementation 5 of the present specification.

FIG. 8 is a schematic flowchart illustrating an automatic vending method, according to implementation 5 of the present specification. Referring to FIG. 8, the method can be performed by a mobile terminal 11, a resource management terminal 12, and a server 13 in FIG. 1. The method can include the following steps:

Step 82: A mobile terminal determines identification information of a target channel of a vending machine based on magnetic field intensity change data of the vending machine sensed when approaching the vending machine, and sends the identification information of the target channel to the vending machine.

Step 84: The vending machine sends a resource transfer request to a merchant server, where the resource transfer request includes identification information of a user, identification information of the vending machine, and the identification information of the target channel.

Step 86: The merchant server determines, based on the identification information of the target channel, a target product selected by the user, and trades the target product based on the identification information of the user and the identification information of the vending machine.

It is not difficult to understand that, implementations of the steps in the present implementation correspond to the content described in implementation 1 and implementation 2. Therefore, implementations of step 82 to step 86 are omitted here for simplicity.

In addition, referring to implementation 3 and implementation 4, the present implementation can be further improved as follows:

The mobile terminal determines, based on the magnetic field intensity change data, the identification information of the target resource selected by the user, and adds the identification information of the target resource to the selection instruction and sends the selection instruction to the vending machine. Then the vending machine initiates a transaction request associated with the target resource and the server completes the transaction.

It can be seen that in the present implementation, the user moves the mobile terminal into a vicinity of the target resource in the resource management terminal. The mobile terminal senses the magnetic field intensity change data of the resource management terminal at the location by using the magnetic field sensor, and then determines the target resource of the resource management terminal at the location based on the magnetic field intensity change data, and informs the resource management terminal of the target resource, so as to determine the resource selected by the user. It has advantages of convenience and quickness in comparison with the existing technology in which the user needs to press physical keys or perform a selection operation on the touchscreen of the resource management terminal.

In addition, to simplify description, all the previously described method implementations are described as a series of movement combinations. However, a person skilled in the art should understand that the implementations of the present application are not limited to a sequence of the described movements. According to the implementations of the present application, some steps can be performed in another sequence or simultaneously. In addition, a person skilled in the art should also understand that all the implementations described in the present specification are example implementations, and the related actions are not necessarily required by the implementations of the present application.

Implementation 6

Figure 9:
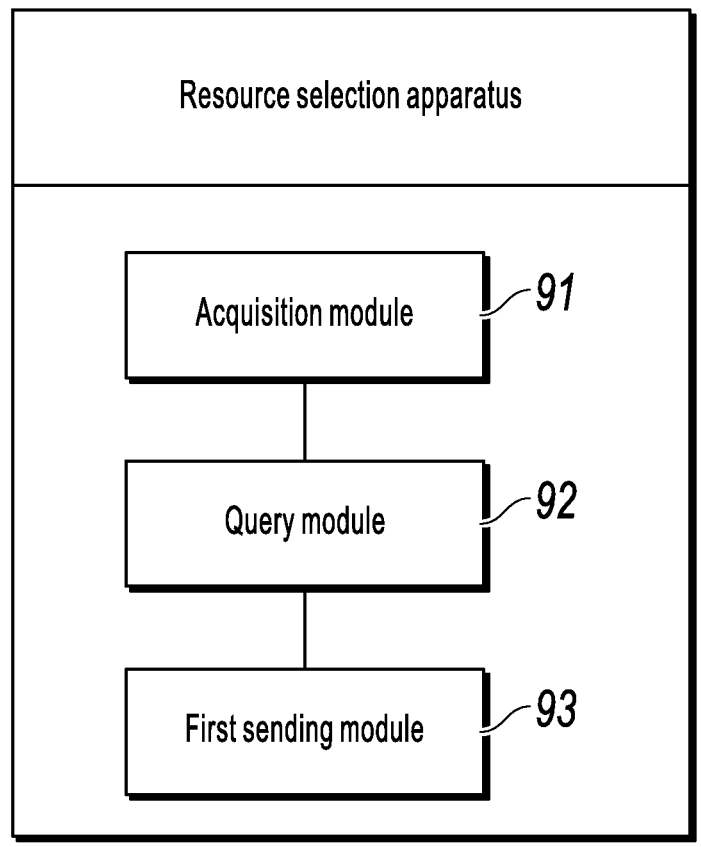
FIG. 9 is a schematic structural diagram illustrating a resource selection apparatus, according to implementation 6 of the present specification.

FIG. 9 is a schematic structural diagram illustrating a resource selection apparatus, according to implementation 6 of the present specification. Referring to FIG. 9, the apparatus can include an acquisition module 91, a query module 92, and a first sending module 93.

The acquisition module 91 is configured to obtain magnetic field intensity change data of a resource management terminal that is sensed by a mobile terminal within a predetermined range of the resource management terminal.

The query module 92 is configured to locate identification information of a target channel from multiple channels included in a rack of the resource management terminal based on the magnetic field intensity change data.

The first sending module 93 is configured to send a selection instruction to the resource management terminal, where the selection instruction includes the identification information of the target channel, and is used to confirm a target resource selected by a user.

The channel list includes identification information of a channel, and magnetic field intensity change data corresponding to the identification information.

The query module 92 is specifically configured to: match the magnetic field intensity change data with magnetic field intensity change data in the channel list; and if the channel list includes magnetic field intensity change data that matches the magnetic field intensity change data, determine that a channel corresponding to the magnetic field intensity change data that matches the magnetic field intensity change data is the target channel.

Optionally, the apparatus further includes the following: a second sending module, configured to send a query request to the resource management terminal, where the query request includes identification information of the user; and a receiving module, configured to receive a channel list returned by the resource management terminal in response to the query request.

Optionally, the apparatus further includes the following: a third sending module, configured to send a connection request to the resource management terminal when obtaining, through scanning, a Bluetooth signal and/or a Wi-Fi signal sent by the resource management terminal.

Optionally, the apparatus further includes the following: a display module, configured to display a predetermined interaction interface, where the interaction interface is used to request to grant a resource transfer permission to the user; and a fourth sending module, configured to send an authorization instruction to the resource management terminal if a confirmation operation of the user is detected.

Implementation 7

Figure 10:
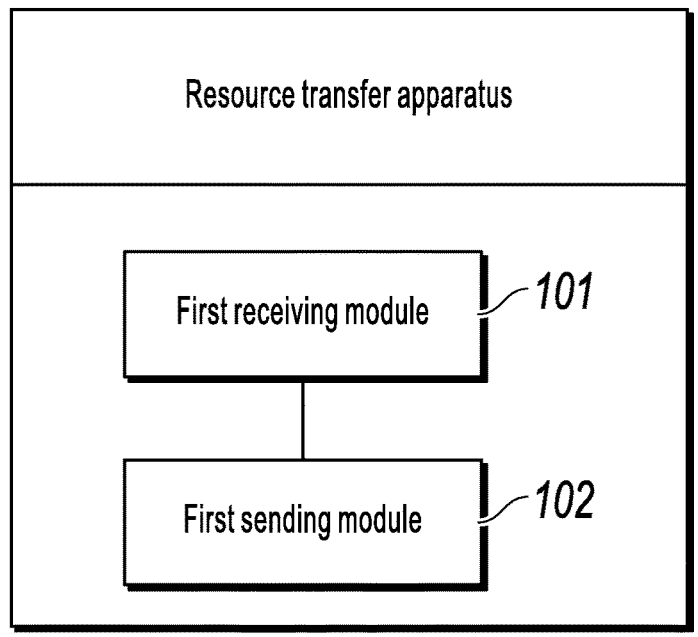
FIG. 10 is a schematic structural diagram illustrating a resource transfer apparatus, according to implementation 7 of the present specification.

FIG. 10 is a schematic structural diagram illustrating a resource transfer apparatus, according to implementation 7 of the present specification. Referring to FIG. 10, the apparatus can include a first receiving module 101 and a first sending module 102.

The first receiving module 101 is configured to receive a selection instruction sent by a mobile terminal, where the selection instruction includes identification information of a target channel, and the identification information of the target channel is determined by the magnetic field intensity change data of a resource management terminal that is sensed within a predetermined range by the mobile terminal.

The first sending module 102 is configured to send a resource transfer request to a server, where the resource transfer request includes identification information of a user, identification information of the resource management terminal, and the identification information of the target channel, so that the server determines, based on the identification information of the target channel, a target resource selected by the user, and performs resource transfer of the target resource based on the identification information of the user and the identification information of the resource management terminal.

Optionally, the apparatus further includes the following: a second receiving module, configured to receive a query request sent by the mobile terminal, where the query request includes the identification information of the user; and a second sending module, configured to return a channel list to the mobile terminal in response to the query request.

Optionally, the apparatus further includes the following: a communications module, configured to transmit a Bluetooth signal and/or a Wi-Fi signal; and establish a connection to the mobile terminal when receiving a connection request sent by the mobile terminal.

Optionally, the apparatus further includes the following: a third receiving module, configured to receive an authorization instruction sent by the mobile terminal, where the authorization instruction is used to instruct to grant a resource transfer permission to the user; and a third sending module, configured to send the authorization instruction to the server.

Implementation 8

Figure 11:
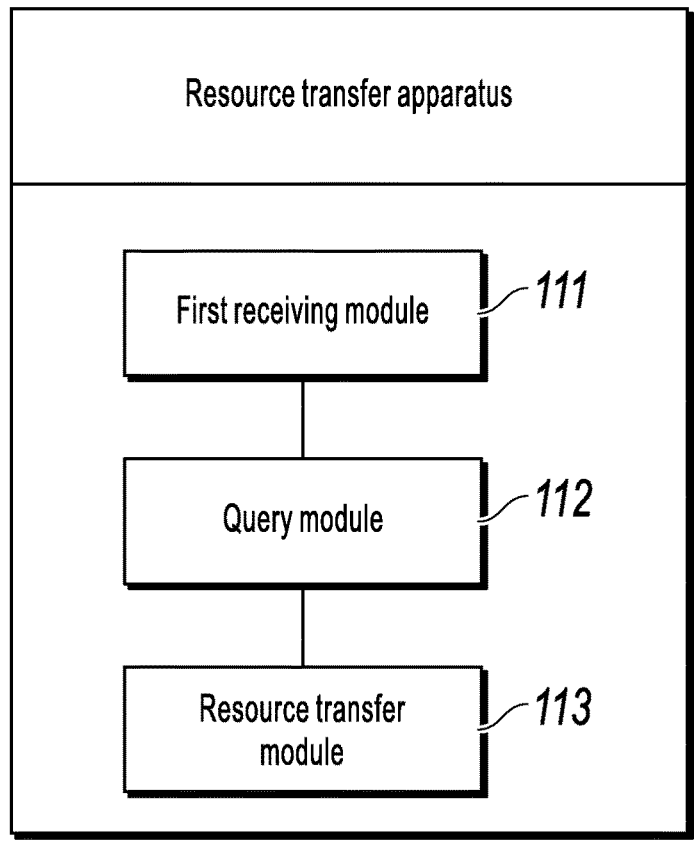
FIG. 11 is a schematic structural diagram illustrating a resource transfer apparatus, according to implementation 8 of the present specification.

FIG. 11 is a schematic structural diagram illustrating a resource transfer apparatus, according to implementation 8 of the present specification. Referring to FIG. 11, the apparatus can include a first receiving module 111, a query module 112, and a resource transfer module 113.

The first receiving module 111 is configured to receive a resource transfer request sent by a resource management terminal, where the resource transfer request includes identification information of a user, identification information of the resource management terminal, and identification information of a target channel of the resource management terminal.

The query module 112 is configured to locate a corresponding resource from a resource list of the resource management terminal based on the identification information of the target channel, as a target resource selected by the user.

The resource transfer module 113 is configured to perform resource transfer of the target resource based on the identification information of the user and the identification information of the resource management terminal.

Optionally, the apparatus further includes the following: a second receiving module, configured to receive an authorization instruction sent by the resource management terminal, where the authorization instruction is used to grant a resource transfer permission of the user to the server; and the resource transfer module is configured to determine a value amount of the target resource; transfer the user's resource that is equivalent to the value amount based on the identification of the user and the authorization instruction; and send instruction information to the resource management terminal based on the identification information of the resource management terminal, where the instruction information is used to instruct the resource management terminal to transfer the target resource to the user.

For the previously described implementations 6-8, it is worthwhile to note that, the user moves the mobile terminal into a vicinity of the target resource in the resource management terminal. The mobile terminal senses the magnetic field intensity change data of the resource management terminal at the location by using the magnetic field sensor, and then determines the target channel of the resource management terminal at the location based on the magnetic field intensity change data, and informs the resource management terminal of the target channel. Then the resource management terminal initiates a resource transfer request that includes the target channel to the server. The server determines, based on the target channel, the target resource selected by the user, completes a payment operation at a back-end, and then instructs the resource management terminal to deliver the product, so as to complete the transaction. Different from the solution in the existing technology in which "product selection" and "payment" are two processes that require the user to perform separate operations, the present implementation only requires the user to move the mobile terminal into a vicinity of the wanted product, so as to perform the "product selection" and "payment" steps at one time, presenting advantages of convenience and quickness, and good user experience.

Implementation 9

Figure 12:
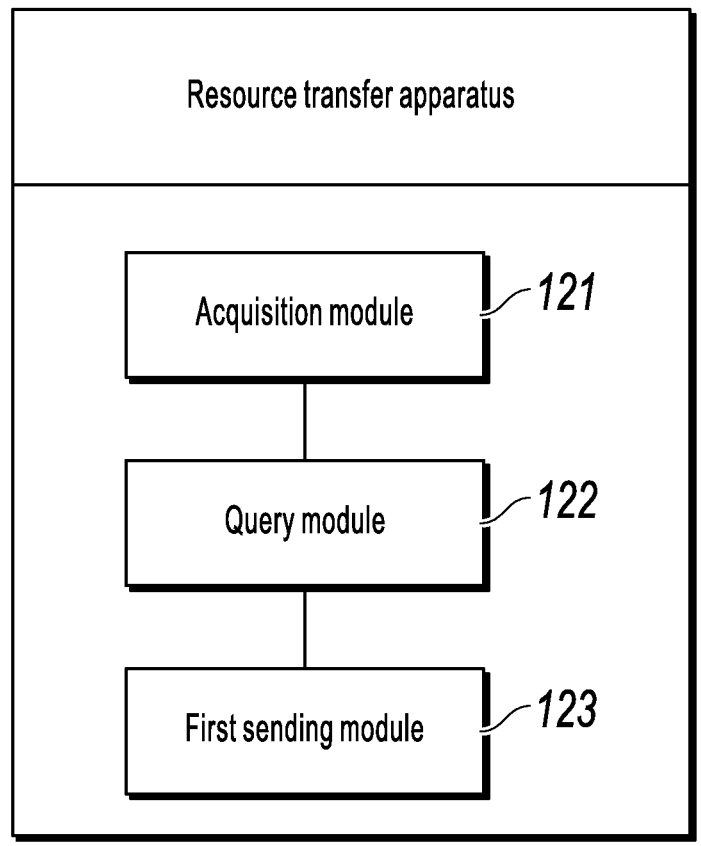
FIG. 12 is a schematic structural diagram illustrating a resource selection apparatus, according to implementation 9 of the present specification.

FIG. 12 is a schematic structural diagram illustrating a resource selection apparatus, according to implementation 9 of the present specification. Referring to FIG. 12, the apparatus can include an acquisition module 121, a query module 122, and a first sending module 123.

The acquisition module 121 is configured to obtain magnetic field intensity change data of a resource management terminal that is sensed by a mobile terminal within a predetermined range of the resource management terminal.

The query module 122 is configured to locate identification information of a target resource from a resource list of the resource management terminal based on the magnetic field intensity change data.

The first sending module 123 is configured to send a selection instruction to the resource management terminal, where the selection instruction includes the identification information of the target resource, and is used to confirm a target resource selected by a user.

Optionally, the apparatus further includes the following: a display module, configured to display a predetermined interaction interface, where the interaction interface is used to request to grant a resource transfer permission to the user; and a second sending module, configured to send an authorization instruction to the resource management terminal if a confirmation operation of the user is detected.

Implementation 10

Figure 13:
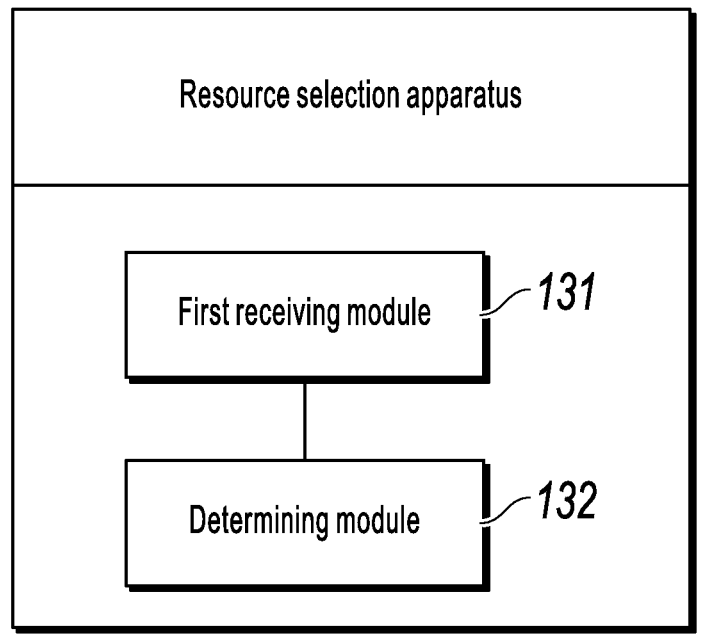
FIG. 13 is a schematic structural diagram illustrating a resource selection apparatus, according to implementation 10 of the present specification.

FIG. 13 is a schematic structural diagram illustrating a resource selection apparatus, according to implementation 10 of the present specification. The resource selection apparatus includes a first receiving module 131 and a determining module 132.

The first receiving module 131 is configured to receive a selection instruction sent by a mobile terminal, where the selection instruction includes identification information of a target resource, and the identification information of the target resource is determined by the magnetic field intensity change data of the resource management terminal that is sensed within a predetermined range by the mobile terminal.

The determining module 132 is configured to determine, based on the identification information of the target resource, a resource selected by a user.

Optionally, the apparatus further includes the following: a first sending module, configured to send a resource transfer request to a server, where the resource transfer request includes identification information of the user, identification information of the resource management terminal, and the identification information of the target resource; and the server performs resource transfer of the target resource based on the identification information of the user and the identification information of the resource management terminal.

Optionally, the apparatus further includes the following: a second receiving module, configured to receive an authorization instruction sent by the mobile terminal, where the authorization instruction is used to instruct to grant a resource transfer permission to the user; and a second sending module, configured to send the authorization instruction to the server.

Implementation 11

Figure 14:
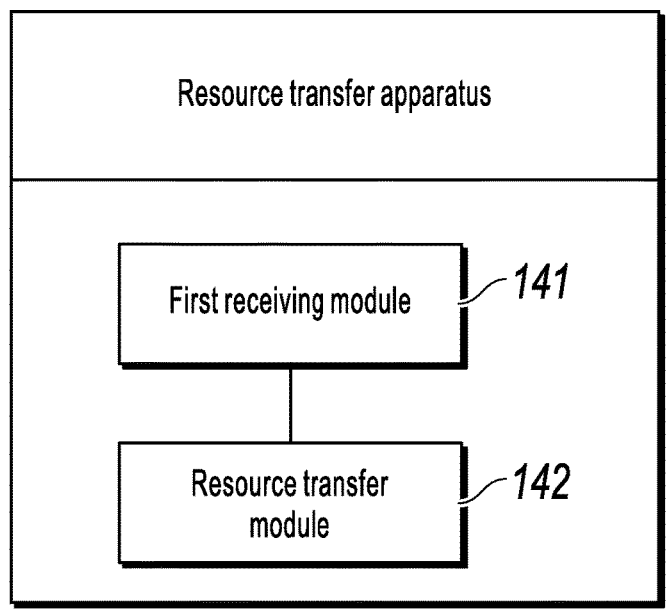
FIG. 14 is a schematic structural diagram illustrating a resource transfer apparatus, according to implementation 11 of the present specification.

FIG. 14 is a schematic structural diagram illustrating a resource transfer apparatus, according to implementation 11 of the present specification. Referring to FIG. 14, the apparatus can include a first receiving module 141 and a resource transfer module 142.

The first receiving module 141 is configured to receive a resource transfer request sent by a resource management terminal, where the resource transfer request includes identification information of a user, identification information of the resource management terminal, and identification information of a target resource of the resource management terminal.

The resource transfer module 142 is configured to perform resource transfer of the target resource based on the identification information of the user and the identification information of the resource management terminal.

Optionally, the apparatus further includes the following: a second receiving module, configured to receive an authorization instruction sent by the resource management terminal, where the authorization instruction is used to grant a resource transfer permission of the user to the server; and the resource transfer module is configured to determine a value amount of the target resource; transfer the user's resource corresponding to the value amount based on the identification of the user and the authorization instruction; and send instruction information to the resource management terminal based on the identification information of the resource management terminal, where the instruction information is used to instruct the resource management terminal to transfer the target resource to the user.

For the previously described implementations 9-11, it is worthwhile to note that, the user moves the mobile terminal into a vicinity of the target resource in the resource management terminal. The mobile terminal senses the magnetic field intensity change data of the resource management terminal at the location by using the magnetic field sensor, and then determines the target resource of the resource management terminal at the location based on the magnetic field intensity change data, and informs the resource management terminal of the target resource, so as to determine the resource selected by the user. Then the resource management terminal initiates a resource transfer request associated with the target resource to the server, and the server completes a payment operation at a back-end, and instructs the resource management terminal to deliver the product, so as to complete the transaction. Different from the solution in the existing technology in which "product selection" and "payment" are two processes that require the user to perform separate operations, the present implementation only requires the user to move the mobile terminal into a vicinity of the wanted product, so as to perform the "product selection" and "payment" steps at one time, presenting advantages of convenience and quickness, and good user experience.

In addition, the previously described apparatus implementation is basically similar to the method implementation, and therefore is described briefly. For related parts, references can be made to related descriptions in the method implementation.

It is worthwhile to note that, the components of the apparatus in the present application are logically divided based on their functions to be implemented. However, the present application is not limited thereto, and the components can be re-divided or combined depending on the needs.

Implementation 12

With reference to FIG. 1, the present specification further provides an automatic vending system, including a mobile terminal 11, a vending machine 12, and a merchant server 13.

The mobile terminal 11 is configured to determine identification information of a target channel of a vending machine based on magnetic field intensity change data of the vending machine sensed when approaching the vending machine, and send the identification information of the target channel to the vending machine.

The vending machine 12 is configured to send a resource transfer request to a merchant server, where the resource transfer request includes identification information of a user, identification information of the vending machine, and the identification information of the target channel.

The merchant server 13 is configured to determine, based on the identification information of the target channel, a target product selected by the user, and trade the target product based on the identification information of the user and the identification information of the vending machine.

It can be seen that in the present implementation, the mobile terminal determines, based on the sensed magnetic field intensity change data, the target channel selected by the user; the server determines, based on the identification information of the target channel, the resource selected by the user, and then completes the transaction associated with the resource at the back-end. Product selection and payment are implemented at one time, presenting advantages of convenience and quickness, and good user experience.

Implementation 13

Figure 15:
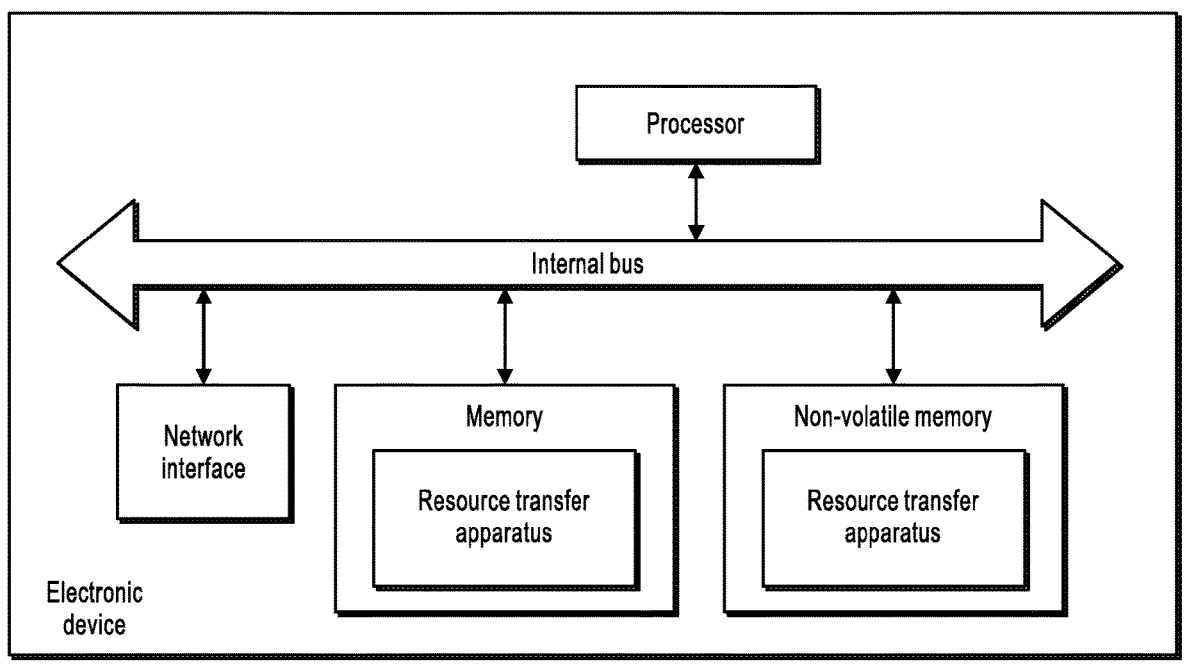
FIG. 15 is a schematic structural diagram illustrating an electronic device, according to implementation 13 of the present specification.

FIG. 15 is a schematic structural diagram illustrating an electronic device, according to implementation 13 of the present specification. Referring to FIG. 15, the electronic device includes a processor, an internal bus, a network interface, a memory, and a non-volatile memory. Certainly, the electronic device may further include hardware needed for other services. The processor reads a corresponding computer program from the non-volatile memory to the memory and then runs the computer program to form a resource selection apparatus at the logic level. Certainly, in addition to software implementations, the present application does not preclude other implementations, such as a logic device or a combination of software and hardware. In other words, an execution body of the following processing procedure is not limited to each logical unit, and can be hardware or a logic device.

The network interface, the processor, and the memory can be interconnected by using a bus system. The bus can be an Industry Standard Architecture (ISA) bus, a Peripheral Component Interconnect (PCI) bus, an Extended Industry Standard Architecture (EISA) bus, etc. The bus can be classified into an address bus, a data bus, a control bus, etc. For ease of representation, the bus is represented by using only one double-headed arrow in FIG. 15. However, it does not mean that there is only one bus or only one type of bus.

The memory is configured to store a program. The program can include program code, and the program code includes a computer operation instruction. The memory can include a read-only memory and a random access memory, and provide an instruction and data for the processor. The memory may include a high-speed random access memory (RAM), or may include a non-volatile memory such as at least one magnetic disk storage.

The processor is configured to execute the program stored in the memory to perform the following operations: obtaining magnetic field intensity change data of a resource management terminal that is sensed by a mobile terminal within a predetermined range of the resource management terminal; locating identification information of a target channel from multiple channels included in a rack of the resource management terminal based on the magnetic field intensity change data; and sending a selection instruction to the resource management terminal, where the selection instruction includes the identification information of the target channel, and is used to confirm a target resource selected by a user; or obtaining magnetic field intensity change data of a resource management terminal that is sensed by a mobile terminal within a predetermined range of the resource management terminal; locating identification information of a target resource from a resource list of the resource management terminal based on the magnetic field intensity change data; and sending a selection instruction to the resource management terminal, where the selection instruction includes the identification information of the target resource, and is used to confirm a target resource selected by a user; or receiving a selection instruction sent by a mobile terminal, where the selection instruction includes identification information of a target resource, and the identification information of the target resource is determined by the magnetic field intensity change data of the resource management terminal that is sensed within a predetermined range by the mobile terminal; and determining, based on the identification information of the target resource, a resource selected by a user.

Thus, the user moves the mobile terminal into a vicinity of the target resource in the resource management terminal. The mobile terminal senses the magnetic field intensity change data of the resource management terminal at the location by using the magnetic field sensor, and then determines the target channel/target resource of the resource management terminal at the location based on the magnetic field intensity change data, and informs the resource management terminal of the target channel/target resource, so as to determine the resource selected by the user. It has advantages of convenience and quickness in comparison with the existing technology in which the user needs to press physical keys or perform a selection operation on the touchscreen of the resource management terminal.

The previously described method performed by the resource selection apparatus or a master node disclosed in the implementations shown in FIG. 9, FIG. 12, and FIG. 13 of the present application can be applied to the processor or implemented by the processor. The processor may be an integrated circuit chip with a signal processing capability. In an implementation process, the steps of the previously described method can be implemented by using a hardware integrated logic circuit in the processor, or by using instructions in a form of software. The processor can be a general-purpose processor, including a central processing unit (CPU), a network processor (NP), etc.; or can also be a digital signal processor (DSP), an application-specific integrated circuit (ASIC), a field-programmable gate array (FPGA) or another programmable logic device, a discrete gate or transistor logic device, or a discrete hardware component. The processor can implement or perform the methods, the steps, and the logical block diagrams that are disclosed in the implementations of the present application. The general-purpose processor can be a microprocessor or the processor can be any conventional processor, etc. The steps of the methods disclosed with reference to the implementations of the present application can be directly performed and completed by a hardware decoding processor, or can be performed and completed by using a combination of hardware in a decoding processor and a software module. The software module can be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the previously described methods in combination with hardware in the processor.

Figure 4:
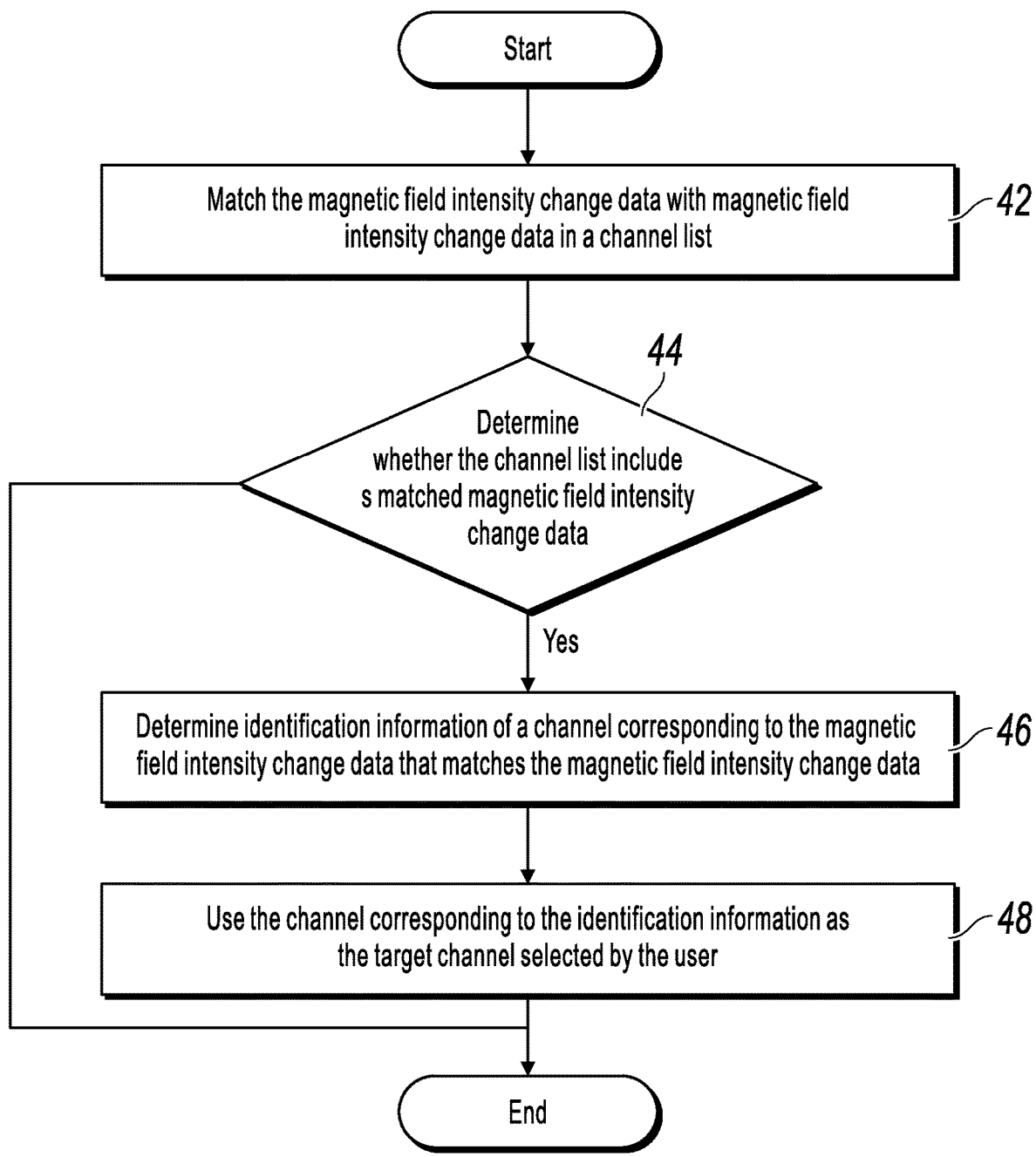
FIG. 4 is a schematic flowchart illustrating a step of determining a target channel in a resource selection method, according to implementation 1 of the present specification.

The resource selection apparatus can further perform the methods in FIG. 3, FIG. 4, and FIG. 6, and implement the method performed by the master node.

Based on the same inventive concept, an implementation of the present application further provides a computer readable storage medium, where the computer readable storage medium stores one or more programs, and when the one or more programs are executed by an electronic device that includes multiple applications, the electronic device is enabled to perform the resource selection methods provided in implementations 1 and 3.

Implementation 14

Figure 16:
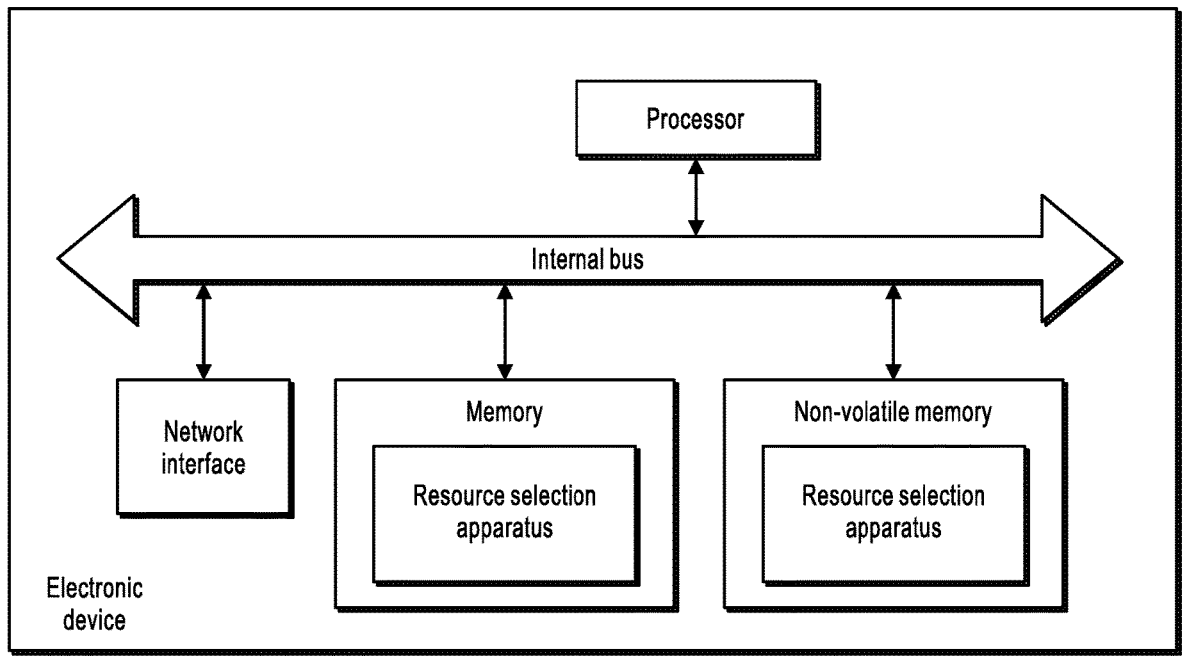
FIG. 16 is a schematic structural diagram illustrating an electronic device, according to implementation 14 of the present specification.

FIG. 16 is a schematic structural diagram illustrating an electronic device, according to implementation 14 of the present specification. Referring to FIG. 16, the electronic device includes a processor, an internal bus, a network interface, a memory, and a non-volatile memory. Certainly, the electronic device may further include hardware needed for other services. The processor reads a corresponding computer program from the non-volatile memory to the memory and then runs the computer program to form a resource transfer apparatus at the logic level. Certainly, in addition to software implementations, the present application does not preclude other implementations, such as a logic device or a combination of software and hardware. In other words, an execution body of the following processing procedure is not limited to each logical unit, and can be hardware or a logic device.

The network interface, the processor, and the memory can be interconnected by using a bus system. The bus can be an Industry Standard Architecture (ISA) bus, a Peripheral Component Interconnect (PCI) bus, an Extended Industry Standard Architecture (EISA) bus, etc. The bus can be classified into an address bus, a data bus, a control bus, etc. For ease of representation, the bus is represented by using only one double-headed arrow in FIG. 16. However, it does not mean that there is only one bus or only one type of bus.

The memory is configured to store a program. The program can include program code, and the program code includes a computer operation instruction. The memory can include a read-only memory and a random access memory, and provide an instruction and data for the processor. The memory may include a high-speed random access memory (RAM), or may include a non-volatile memory such as at least one magnetic disk storage.

The processor is configured to execute the program stored in the memory to perform the following operations: receiving a selection instruction sent by a mobile terminal, where the selection instruction includes identification information of a target channel, and the identification information of the target channel is determined by the magnetic field intensity change data of a resource management terminal that is sensed within a predetermined range by the mobile terminal; and sending a resource transfer request to a server, where the resource transfer request includes identification information of a user, identification information of the resource management terminal, and the identification information of the target channel, so that the server determines, based on the identification information of the target channel, a target resource selected by the user, and performs resource transfer of the target resource based on the identification information of the user and the identification information of the resource management terminal; or receiving a resource transfer request sent by a resource management terminal, where the resource transfer request includes identification information of a user, identification information of the resource management terminal, and identification information of a target channel of the resource management terminal; locating a corresponding resource from a resource list of the resource management terminal based on the identification information of the target channel, as a target resource selected by the user; and performing resource transfer of the target resource based on the identification information of the user and the identification information of the resource management terminal; or receiving a resource transfer request sent by a resource management terminal, where the resource transfer request includes identification information of a user, identification information of the resource management terminal, and identification information of a target resource of the resource management terminal; and performing resource transfer of the target resource based on the identification information of the user and the identification information of the resource management terminal.

It can be seen that in the present implementation, the resource management terminal sends a Bluetooth signal and/or a Wi-Fi signal to identity itself, and identifies channels by using different magnetic field change rules. As such, when approaching a wanted product, the mobile terminal can sense corresponding magnetic field intensity change data, and then determine identification information of the target resource nearby and inform the resource management terminal of the identification information, so as to determine the product selected by the user. Then the resource management terminal initiates a resource transfer request to the server, and the server completes a payment operation at a back-end, and instructs the resource management terminal to deliver the product, so as to complete the transaction. Different from the solution in the existing technology in which "product selection" and "payment" are two processes that require the user to perform separate operations, the present implementation only requires the user to move the mobile terminal into a vicinity of the wanted product, so as to perform the "product selection" and "payment" steps at one time, presenting advantages of convenience and quickness, and good user experience.

The previously described method performed by the resource transfer apparatus or a master node disclosed in the implementations shown in FIG. 10, FIG. 11, and FIG. 14 of the present application can be applied to the processor or implemented by the processor. The processor may be an integrated circuit chip with a signal processing capability. In an implementation process, the steps of the previously described method can be implemented by using a hardware integrated logic circuit in the processor, or by using instructions in a form of software. The processor can be a general-purpose processor, including a central processing unit (CPU), a network processor (NP), etc.; or can also be a digital signal processor (DSP), an application-specific integrated circuit (ASIC), a field-programmable gate array (FPGA) or another programmable logic device, a discrete gate or transistor logic device, or a discrete hardware component. The processor can implement or perform the methods, the steps, and the logical block diagrams that are disclosed in the implementations of the present application. The general-purpose processor can be a microprocessor or the processor can be any conventional processor, etc. The steps of the methods disclosed with reference to the implementations of the present application can be directly performed and completed by a hardware decoding processor, or can be performed and completed by using a combination of hardware in a decoding processor and a software module. The software module can be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the previously described methods in combination with hardware in the processor.

The resource transfer apparatus can further perform the methods in FIG. 5, FIG. 7, and FIG. 8, and implement the method performed by the master node.

Based on the same inventive concept, an implementation of the present application further provides a computer readable storage medium, where the computer readable storage medium stores one or more programs, and when the one or more programs are executed by an electronic device that includes multiple applications, the electronic device is enabled to perform the resource transfer methods provided in implementations 2, 4, and 5.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

The specific implementations of the present specification are described previously. Other implementations are within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a magnetic disk memory, a CD-ROM, and an optical memory) that include computer-usable program code.

The present application is described with reference to the flowcharts and/or block diagrams of the method, the device (system), and the computer program product according to the implementations of the present application. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a magnetic disk storage, a CD-ROM, an optical memory, etc.) that include computer usable program code.

The previous descriptions are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A method, comprising:
   obtaining, by a mobile device placed within a predetermined range of a resource management terminal, data comprising changes in magnetic field intensity of the resource management terminal;
   determining, by the mobile device and based on the data comprising changes in the magnetic field intensity, a first target channel from a plurality of channels in a rack of the resource management terminal; and
   sending, by the mobile device and to the resource management terminal, a target resource selection instruction, wherein the target resource selection instruction comprises information that specifies the first target channel.

2. The method according to claim 1, comprising, prior to determining the first target channel from the plurality of channels included in the rack of the resource management terminal:
   sending a query request to the resource management terminal, wherein the query request comprises identification information of a user; and
   receiving information about the plurality of channels returned by the resource management terminal in response to the query request.

3. The method according to claim 2, comprising, prior to sending a query request to the resource management terminal:
   searching for a Bluetooth signal or a Wi-Fi signal sent by the resource management terminal;
   in response to identifying the Bluetooth signal or the Wi-Fi signal, sending a connection request to the resource management terminal.

4. The method according to claim 2, wherein the information about the plurality of channels comprises channel identifiers of the plurality of channels, respectively, and magnetic field intensity change rules corresponding to the channel identifiers, respectively.

5. The method according to claim 4, wherein determining the first target channel from the plurality of channels included in the rack of the resource management terminal comprises:
   comparing the data comprising the changes in the magnetic field intensity with some or all of the magnetic field intensity change rules;
   determining that the data matches with a first magnetic field intensity change rule of a first channel from the plurality of channels; and
   in response to determining that the data matches with a first magnetic field intensity change rule of the first channel from the plurality of channels, identifying the first channel as the first target channel.

6. The method according to claim 1, further comprising:
   displaying, on the mobile device, a predetermined user interface;
   receiving, through the predetermined user interface, a confirmation of authorization instruction for resource transfer; and
   sending the authorization instruction to the resource management terminal.

7. A method, comprising:
   receiving, by a resource management terminal, a selection instruction sent by a mobile device, wherein the selection instruction comprises information that specifies a first target channel from a plurality of channels in a rack of the resource management terminal, and wherein the information that specifies the first target channel is derived by the mobile device responsive to the mobile device sensing data describing changes in magnetic field intensity of the resource management terminal;
   sending, by the resource management terminal, a resource transfer request to a server, wherein the resource transfer request comprises identification information of a user of the mobile device, a resource management terminal identifier, and the information that specifies the first target channel;
   receiving, by the resource management terminal and from the server, information specifying a target resource selected by the user; and
   setting, by the resource management terminal, the target resource available for transfer to the user.

8. The method according to claim 7, comprising:
   receiving a query request sent by the mobile device, wherein the query request comprises the identification information of the user; and
   returning information about the plurality of channels to the mobile device in response to the query request.

9. The method according to claim 7, comprising:
   emitting a Bluetooth signal or a Wi-Fi signal; and
   in response receiving a connection request sent by the mobile device, establishing a Bluetooth or Wi-Fi connection to the mobile device.

10. The method according to claim 7, comprising, prior to sending a resource transfer request to a server:
    receiving an authorization instruction for resource transfer from the mobile device that is confirmed by the user of the mobile device; and
    sending the resource transfer request to the server.

11. A non-transitory, computer-readable medium storing one or more instructions executable by a computer system to perform operations comprising:
    obtaining, by a mobile device placed within a predetermined range of a resource management terminal, data comprising changes in magnetic field intensity of the resource management terminal;
    determining, by the mobile device and based on the data comprising changes in the magnetic field intensity, a first target channel from a plurality of channels in a rack of the resource management terminal; and
    sending, by the mobile device and to the resource management terminal, a target resource selection instruction, wherein the target resource selection instruction comprises information that specifies the first target channel.

12. The non-transitory, computer-readable medium of claim 11, wherein the operations further comprise, prior to determining the first target channel from the plurality of channels included in the rack of the resource management terminal:
    sending a query request to the resource management terminal, wherein the query request comprises identification information of a user; and
    receiving information about the plurality of channels returned by the resource management terminal in response to the query request.

13. The non-transitory, computer-readable medium of claim 11, wherein the operations further comprise, prior to sending a query request to the resource management terminal:
- searching for a Bluetooth signal or a Wi-Fi signal sent by the resource management terminal;
- in response to identifying the Bluetooth signal or the Wi-Fi signal, sending a connection request to the resource management terminal.

14. The non-transitory, computer-readable medium of claim 12, wherein the information about the plurality of channels comprises channel identifiers of the plurality of channels, respectively, and magnetic field intensity change rules corresponding to the channel identifiers, respectively.

15. The non-transitory, computer-readable medium of claim 14, wherein determining the first target channel from the plurality of channels included in the rack of the resource management terminal comprises:
- comparing the data comprising the changes in the magnetic field intensity with some or all of the magnetic field intensity change rules;
- determining that the data matches with a first magnetic field intensity change rule of a first channel from the plurality of channels; and
- in response to determining that the data matches with a first magnetic field intensity change rule of the first channel from the plurality of channels, identifying the first channel as the first target channel.

16. The non-transitory, computer-readable medium of claim 11, wherein the operations further comprise:
- displaying, on the mobile device, a predetermined user interface;
- receiving, through the predetermined user interface, a confirmation of authorization instruction for resource transfer; and
- sending the authorization instruction to the resource management terminal.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
- obtaining, by a mobile device placed within a predetermined range of a resource management terminal, data comprising changes in magnetic field intensity of the resource management terminal;
- determining, by the mobile device and based on the data comprising changes in the magnetic field intensity, a first target channel from a plurality of channels in a rack of the resource management terminal; and
- sending, by the mobile device and to the resource management terminal, a target resource selection instruction, wherein the target resource selection instruction comprises information that specifies the first target channel.

18. The computer-implemented system of claim 17, wherein the operations further comprise, prior to determining the first target channel from the plurality of channels included in the rack of the resource management terminal:
- sending a query request to the resource management terminal, wherein the query request comprises identification information of a user; and
- receiving information about the plurality of channels returned by the resource management terminal in response to the query request.

19. The computer-implemented system of claim 17, wherein the operations further comprise, prior to sending a query request to the resource management terminal:
- searching for a Bluetooth signal or a Wi-Fi signal sent by the resource management terminal;
- in response to identifying the Bluetooth signal or the Wi-Fi signal, sending a connection request to the resource management terminal.

20. The computer-implemented system of claim 18, wherein the information about the plurality of channels comprises channel identifiers of the plurality of channels, respectively, and magnetic field intensity change rules corresponding to the channel identifiers, respectively.

21. The computer-implemented system of claim 20, wherein determining the first target channel from the plurality of channels included in the rack of the resource management terminal comprises:
- comparing the data comprising the changes in the magnetic field intensity with some or all of the magnetic field intensity change rules;
- determining that the data matches with a first magnetic field intensity change rule of a first channel from the plurality of channels; and
- in response to determining that the data matches with a first magnetic field intensity change rule of the first channel from the plurality of channels, identifying the first channel as the first target channel.

22. The computer-implemented system of claim 17, wherein the operations further comprise:
- displaying, on the mobile device, a predetermined user interface;
- receiving, through the predetermined user interface, a confirmation of authorization instruction for resource transfer; and
- sending the authorization instruction to the resource management terminal.

* * * * *